US006971116B2

(12) United States Patent
Takeda et al.

(10) Patent No.: US 6,971,116 B2
(45) Date of Patent: Nov. 29, 2005

(54) STAMPER FOR PRODUCING OPTICAL RECORDING MEDIUM, OPTICAL RECORDING MEDIUM, AND METHODS OF PRODUCING THE SAME

(75) Inventors: Minoru Takeda, Tokyo (JP); Nobuyuki Arakawa, Kanagawa (JP); Motohiro Furuki, Tokyo (JP); Shingo Imanishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 388 days.

(21) Appl. No.: 10/183,649

(22) Filed: Jun. 27, 2002

(65) Prior Publication Data

US 2003/0031116 A1 Feb. 13, 2003

(30) Foreign Application Priority Data

Jun. 28, 2001 (JP) .................................... P2001-196945
Oct. 29, 2001 (JP) .................................... P2001-331531

(51) Int. Cl.[7] ............................ G11B 7/24; B29D 17/00
(52) U.S. Cl. ...................... 720/718; 264/1.33; 264/299; 264/107; 216/62; 204/192.34
(58) Field of Search ............................ 369/283, 275.4; 720/718; 204/192.34; 216/41, 52–53, 88–91, 58–81; 430/296, 321, 9, 11, 945; 425/542, 810; 264/1.33, 1.36, 1.37, 1.38, 106, 107, 299; 451/41, 51

(56) References Cited

U.S. PATENT DOCUMENTS 4,953,385 A * 9/1990 Aoki et al. .................... 72/462
5,338,178 A * 8/1994 Kato et al. .................... 425/385
5,503,963 A * 4/1996 Bifano ......................... 430/321
5,843,626 A * 12/1998 Ohta et al. .................... 430/320
5,897,814 A * 4/1999 Niemeyer et al. ........... 264/1.33
6,207,247 B1 * 3/2001 Morita ......................... 428/64.1
6,288,998 B1 * 9/2001 Taira ......................... 369/275.4
6,333,089 B1 * 12/2001 Hirata et al. ................ 428/64.1
6,814,897 B2 * 11/2004 Morita ......................... 264/1.33
2001/0050444 A1 * 12/2001 Katsumura et al. ........ 264/1.33

FOREIGN PATENT DOCUMENTS

EP 694916 A2 * 1/1996 ............ G11B/7/26
JP 03150738 A * 6/1991 ............ G11B/7/26

(Continued)

Primary Examiner—William J Klimowicz
(74) Attorney, Agent, or Firm—Sonnenschein, Nath & Rosenthal LLP

(57) ABSTRACT

A stamper suppressed in surface roughness, uneven thickness, and deviation of circularity in inner circumference, a method of producing the same, an optical recording medium produced by molding using the stamper, and a method of producing the same, wherein a base member having a mirror polished main surface and comprising silicon or glass is formed with a resist film; the resist film is exposed and developed so as to form a resist film of a pattern corresponding to relief shapes; the mirror surface of the base member is processed to relief shapes (projecting regions and recessed regions) by dry etching etc. using the obtained resist film as a mask so as to obtain a stamper; the obtained stamper is used for injection molding to form a medium substrate; and an optical recording multilayer film and a protective layer are formed to thereby produce an optical recording medium.

3 Claims, 19 Drawing Sheets

FOREIGN PATENT DOCUMENTS

| | | | | | |
|---|---|---|---|---|---|
| JP | 04205936 | A | * | 7/1992 | ............ G11B/7/26 |
| JP | 04241237 | A | * | 8/1992 | ............ G11B/7/26 |
| JP | 04259937 | A | * | 9/1992 | ............ G11B/7/26 |
| JP | 04307442 | A | * | 10/1992 | ............ G11B/7/26 |
| JP | 05205321 | A | * | 8/1993 | ............ G11B/7/26 |
| JP | 05234153 | A | * | 9/1993 | ............ G11B/7/26 |
| JP | 06060441 | A | * | 3/1994 | ............ G11B/7/26 |
| JP | 06349115 | A | * | 12/1994 | ............ G11B/7/26 |
| JP | 07161080 | A | * | 6/1995 | ............ G11B/7/26 |
| JP | 09297940 | A | * | 11/1997 | ............ G11B/7/26 |
| JP | 10097739 | A | * | 4/1998 | ............ G11B/7/26 |
| JP | 10241213 | A | * | 9/1998 | ............ G11B/7/26 |
| JP | 11149669 | A | * | 6/1999 | ............ G11B/7/26 |
| JP | 11296918 | A | * | 10/1999 | ............ G11B/7/26 |
| JP | 2000107995 | A | * | 4/2000 | ............ B24B/5/12 |
| JP | 2000348395 | A | * | 12/2000 | ............ G11B/7/26 |
| JP | 20003483994 | A | * | 12/2000 | ............ G11B/7/26 |
| JP | 2001014742 | A | * | 1/2001 | ............ G11B/7/26 |
| JP | 2001143331 | A | * | 5/2001 | ............ G11B/7/26 |
| JP | 2001143332 | A | * | 5/2001 | ............ G11B/7/26 |
| JP | 2001155386 | A | * | 6/2001 | ............ G11B/7/26 |

\* cited by examiner

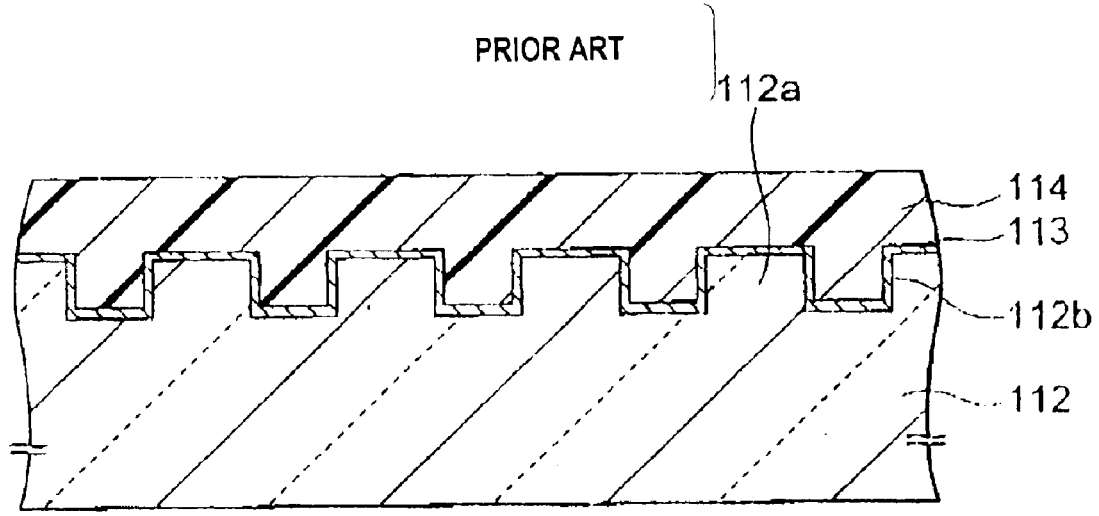

STAMPER FOR PRODUCING OPTICAL RECORDING MEDIUM, OPTICAL RECORDING MEDIUM, AND METHODS OF PRODUCING THE SAME

RELATED APPLICATION DATA

The present application claims priority to Japanese Application(s) No(s). P2001-196945 filed Jun. 28, 2001, and P2001-331531 filed Oct. 29, 2001, which application(s) is/are incorporated herein by reference to the extent permitted by law.

BACKGROUND OF THE INVENTION

1. Field of the Invention

The present invention relates to a stamper used in a process of producing an optical recording medium (hereinafter also referred to as an "optical disk"), an optical recording medium, and methods of producing the same.

2. Description of the Related Art

In recent years, along with the advances made in technology for recording moving pictures, still images, and other video data in a digital format, compact disk (CD), digital versatile disk (DVD), and other optical disk apparatuses have been spotlighted as large capacity recording apparatuses. Research is underway for further increasing their capacity.

FIG. 1 is a cross-sectional view of principal parts of an optical disk of the related art.

One surface of a light transmitting disk substrate 112 made of for example polycarbonate is provided with projecting regions 112a and recessed regions 112b defining track regions.

That surface has further formed on it an optical recording multilayer film 113 comprised for example of a dielectric film, a phase change film or other recording film, another dielectric film, a reflection film, etc. stacked in that order. The configuration and the number of layers of the optical recording multilayer film 113 differ in accordance with the type of the recording material and the design.

Furthermore, a protective film 114 is formed on the optical recording multilayer film 113.

In the above optical disk, when recording or reproducing information, a laser light is irradiated for example from the disk substrate 112 side to the optical recording multilayer film 113.

When reproducing from the optical disk, a light receiving element receives the return light reflected on the optical recording multilayer film 113, and a signal processing circuit generates a predetermined signal to give a reproduction signal.

In the above optical disk, the optical recording multilayer film 113 is also provided with relief shapes in accordance with the projecting regions 112a and recessed regions 112b provided on one surface of the disk substrate 112. The projecting regions 112a and recessed regions 112b define the track regions.

The projecting regions 112a are referred as "lands", which are projecting to the protective film 114 side when viewed from the disk substrate 112 side, while the recessed regions 112b are referred as "grooves". It is possible to record information both at the lands and the grooves or use only one of the lands and grooves as recording regions.

Further, by forming pits having lengths corresponding to the recorded data as the relief shapes of the disk substrate 112 and by using an aluminum film or other reflection film as an optical recording film instead of the optical recording multilayer film 113, it is possible to obtain a read only (ROM) type optical disk.

The capacity of optical disk apparatuses using such optical disks can be increased by shortening the wavelength of the laser light used for recording and reproduction of the optical disk and by increasing the numerical aperture (NA) of the object lens.

Further, the increase in the numerical aperture (NA) of the object lens leads to less tolerance to disk tilt in the optical disk apparatus, so to bring the coma within the allowable range, it is necessary to make the light transmitting layer thin.

For example, in a CD, the wavelength of the laser light is in the 780 nm band, the numerical aperture of the object lens is 0.45, and the thickness of the light transmitting disk substrate is 1.2 mm. On the other hand, in a DVD, the wavelength of the laser light is in the 650 nm band, the numerical aperture of the object lens is 0.6, and the thickness of a light transmitting disk substrate is 0.6 mm. For example, two disk substrates are bonded together for use as a substrate having a thickness of 1.2 mm.

As a next generation optical disk apparatus able to handle further increases in recording capacity, there has been proposed an optical disk apparatus shortening the wavelength of the laser light to the blue to bluish violet region (for example, 400 nm), increasing the numerical aperture of the object lens to 0.8 or more (for example, 0.85), and, corresponding to this, using an optical recording medium having a thickness of the light transmitting layer reduced to about 0.1 mm. Since the above light transmitting layer having a thickness of 0.1 mm has insufficient rigidity, a disk substrate having a thickness of about 1.1 mm is used.

A method of producing the above optical disk will be explained next.

FIG. 2A is a schematic view of the configuration of a cutting apparatus (exposure apparatus) used in the above method of production, while FIG. 2B is a perspective view of principal portions.

As a light source, for example a Kr gas (ion) laser GL having an oscillation wavelength of 351 nm is provided. On its light axis, an electro-optic modulator EOM, a polarized beam splitter PBS1, a mirror M1, a lens L1, an acousto-optic modulator AOM, a lens L2, a mirror M2, a lens L3, a lens L4, a dichroic mirror DCM, a mirror M3, and an object lens OL are arranged as optical elements at predetermined positions.

The optical elements of the mirror M2 and before are fixed on a fixed table, while the optical elements of the lens L3 on are mounted on a movable table MT.

Further, a resist disk RD' obtained by forming a resist film R on a glass substrate G to be exposed by the cutting apparatus is chucked on an air spindle capable of being driven to rotate with a high rotational accuracy by a spindle motor.

A laser light LT1 emitted from the gas laser GL passes through the electro-optic modulator EOM and the polarized beam splitter PBS1 and is reflected at the mirror M1 to be bent in direction of advance. At this time, part of the laser light LT1 passes through the mirror M1 and strikes a photodiode PD1.

The laser light LT1 reflected at the mirror M1 in the above way is focused by the lens L1, passes through the acousto-optic modulator AOM and is returned to parallel light by the lens L2, and is reflected at the mirror M2 and bent in direction of advance. At this time, part of the laser light LT1 passes through the mirror M2 and strikes the photodiode PD2.

Depending on the intensity of the light received by the photodiode PD1 and photodiode PD2, automatic power control (APC) is performed to provide feedback to the electro-optic modulator EOM, and obtain a constant output.

Further, the acousto-optic modulator AOM modulates the laser light LT1 in accordance with need.

The laser light LT1 reflected at the mirror M2 is expanded in beam diameter by a beam expander comprising the lenses L3 and L4, passes through the dichroic mirror DCM, is reflected at the mirror M3, and is focused to a spot having a diameter of for example 0.3 $\mu$m on the resist film of the resist disk RD' by the object lens to form an exposure area EX.

The above cutting apparatus can drive the resist disk RD' to rotate in the spindle direction SD by a not shown spindle motor, feed the movable table MT in the radial direction of the resist disk RD' in predetermined increments, and while doing this irradiate the above laser light LT1 to the resist film of the resist disk RD' so as to expose a pattern on the resist disk RD'.

For example, in the process of producing a phase change type optical disk or other rewritable type optical disk, it is possible to make the exposure use laser light scan and expose the resist in a spiral along the pattern of the tracks (lands/grooves) defining the recording regions.

Further, in the process of producing a read only (ROM) type optical disk, it is possible to make the exposure use laser light scan and expose the resist in a spiral while turning it on and off in accordance with the recorded data (information pits).

An auto-focus (A/F) mechanism is provided to keep the focal point of the object lens in register with the resist disk RD' at all times.

For example, an skew ray method using a laser diode LD having an oscillation wavelength of 680 nm as the A/F optical system is used. A laser light LT2 of 680 nm emitted from the laser diode LD is reflected on the light splitting surface of the polarized beam splitter PBS2, passes through a quarter wave plate QWP to be reflected at the dichroic mirror DCM, and strikes the resist disk RD' together with the laser light LT1.

At this time, the laser light LT2 is focused by the object lens OL on the focal plane of the laser light LT1.

The laser light LT2 is reflected at the resist disk RD', passes through the object lens, and returns. The resultant spot is projected on a position sensing diode PSD.

At this time, by making the laser light LT2 strike substantially parallel to the light axis of the object lens from a position somewhat off from the light axis of the object lens and focus at a position somewhat off from the focal point of the laser light LT1 on the resist disk surface, displacement from the focal plane on the light axis of the resist disk surface is detected as displacement of the laser light LT2 on the resist disk. By the optical lever principle, it is detected magnified about 100-fold on the position sensing diode PSD.

In this way, the position of a spot on the position sensing diode PSD is detected, the displacement from the position of the spot of the return light of the laser light LT2 at the time when the resist disk surface is in register with the focal position is fed back as an amount of focal error to an actuator for vertical movement of the object lens to drive the actuator, and A/F servo control is performed to keep the laser light LT1 focused on the resist disk at all times.

Further, the A/F optical system uses the polarized beam splitter PBS2 and the quarter wave plate QWP as polarization elements for effectively separating an outbound path and return path of the laser light LT2.

The above cutting apparatus can be used to produce an optical disk as follows:

First, as shown in FIG. 3A, a resist disk RD' comprising a glass substrate G formed with a resist film R is prepared.

The glass substrate G, for example, has a diameter of 200 mm and a thickness of several mm and is precision polished on its surface.

Further, the resist film R is formed by spin-coating to a thickness of 100 nm using for example a photosensitive positive type photoresist sensitive to ultraviolet rays. The solvent remaining in the resist film R is removed by baking at several tens of degrees Celsius.

Next, as shown in FIG. 3B, the cutting apparatus shown in FIG. 2A and FIG. 2B is used to expose the resist film R by a pattern for exposing regions for forming the recessed regions of the disk substrate and to develop this by an alkali developing solution etc. to form a pattern of the resist film R1 opened at areas for forming the recessed regions in the disk substrate.

Next, as shown in FIG. 4A, for example, the surface is nickel plated to form a stamper 111 on the resist film R1 on the glass substrate G. The surface of the stamper 111 is formed with projecting regions 111a by the transfer of the inverse pattern of relief shapes from the regions R2 for forming recessed regions in the disk substrate opened in the resist film R1. On the other hand, it is formed with recessed regions 111b by the transfer of the inverse pattern of relief shapes in the regions of the resist film R1.

Next, as shown in FIG. 4B, the stamper 111 is removed from the resist film R1 on the glass substrate G.

Next, as shown in FIG. 5A, the above obtained stamper 111 is fixed in a cavity formed by upper and lower molds MD1 and MD2 to form a mold assembly for injection molding. At this time, the stamper 111 is arranged so that its relief shapes forming surface faces the inside of the cavity.

By injecting for example polycarbonate or another resin 112' in the molten state into the cavity of the injection molding mold assembly from a charging port PT of the mold assembly, as shown in FIG. 5B, a disk substrate 112 is formed over the relief pattern of the stamper 111.

Here, the surface of the disk substrate 112 is formed with projecting regions 112a by the transfer of the inverse pattern of relief shapes from the recessed regions 111b in the surface of the stamper 111, while is formed with recessed regions 112b by the transfer of an inverse pattern of relief shapes from the projecting regions 111a of the stamper 111.

The molded article is removed from the injection molding mold assembly to obtain a disk substrate 112 formed with projecting regions 112a and recessed regions 112b on its surface as shown in FIG. 6A.

Next, as shown in FIG. 6B, the surface of the disk substrate 112 is swept by air, nitrogen gas, or another gas to remove dust, then is successively formed with a dielectric film, a recording film, another dielectric film, and a reflection film in that order by, for example, sputtering, to form the optical recording multilayer film 113.

Next, as shown in FIG. 6C, a protective film 114 is formed above the optical recording multilayer film 113.

Due to the above, an optical disk having the configuration shown in FIG. 1 can be produced.

As the above stamper, it is also possible to use a stamper replicated by transfer of relief shapes from the stamper formed on the resist disk by electroplating as a master, that is, a stamper obtained by forming a mother stamper by electroplating the master and further electroplating the mother stamper.

By making the exposure laser light scan and expose the resist in a spiral while being turned on and off in accordance with the recorded data in the exposure process so as to form pits having lengths in accordance with the recorded data as the relief shapes of the disk substrate 112 and forming an aluminum film or other reflection film as the optical recording film, it is also possible to produce a read only (ROM) type optical disk.

If exposing a resist disk by a predetermined pattern by the cutting apparatus shown in FIGS. 2A and 2B, the mechanism as a whole is placed on an air table so as not to be affected by outside vibration of the place of installation.

In this case, the minimum pattern size able to be formed by the cutting, that is, the resolution P, generally depends on the laser wavelength λ, numerical aperture NA of the object lens, properties of the resist film, etc. and is expressed by the formula (1) from a process factor K normally a value from 0.5 to 0.8:

$$P=K(\lambda/NA) \quad (1)$$

For example, when entering λ=351 nm, NA=0.9, and K=0.5, P=0.2 μm stands, and grooves of a track pitch of 0.4 μm or a pattern of the resist film having a line/space ratio (L/S, widths of portions left as pattern and portions removed) of 0.2 μm/0.2 μm is obtained.

Along with the rapid advances made in information communication and image processing technology in recent years, optical disk recording capacities several times greater than the present will probably be demanded in the near future. This means a recording capacity of, for example, more than 20 GB will be required. To achieve this by the same signal processing as that at present on one surface of a disk having a diameter of 12 cm, a groove pattern having a track pitch of 0.4 μm or less has to be formed on a rewritable optical disk.

Further, in a magneto-optical disk, phase change disk, or other rewritable optical disk, a groove pattern of "deep grooves", that is, grooves as thin and deep as possible, is preferable for improving the cross erase characteristic at the time of data write operations.

To form such fine, deep grooves, shortening of the laser wavelength λ and an increase of the numerical aperture NA are required from the above formula (1). However, the present value 0.9 of the numerical aperture NA of the object lens is the limit from the viewpoint of the precision in design and fabrication of lenses.

Turning now to the specific problems to be solved by the invention, the stamper used in the above method of production ends up with rough side surfaces of the resist film or surfaces of edges at pits or guide grooves at unexposed portions due to uneven rotation or uneven development of the resist disk at the time of w exposure in the method of production. Thus, the surface smoothness is low. This appears as noise in a low frequency range and causes deterioration of the signal-to-noise (S/N) ratio. For example, even if the surface roughness Ra of the original glass substrate is about 0.3 nm, the surface roughness Ra of the nickel stamper obtained therefrom ends up becoming about 0.5 nm reflecting the surface roughness of the resist film.

As methods of smoothing the surface roughness and obtaining low signal noise, there are known the method of ashing by oxygen etc. after exposure and development as described in Japanese Examined Patent Publication (Kokoku) No. 7-29386 and the method of treatment by ultraviolet rays as described in Patent Gazette No. 2506983, however the effects thereof are not sufficient.

Further, the stamper used in the above method of production has to be produced to a thickness of at least 0.25 mm by high speed electroplating, so uneven thickness of the inner and outer circumferences occurs particularly easily. Even when uneven thickness of the inner and outer circumferences of the plating film is suppressed by providing a shielding plate in the plating tank, there is uneven thickness of about 3 μm. In addition, since innumerable granular projections inevitably form on the plating film surface in the above electroplating, back polishing is essential, but scratches caused by the abrasives in the polishing agent end up appearing as macro relief (waviness) on the disk substrate formed due to the filling pressure at the time of injection molding. The residual discrepancy of the focus error caused by the above has become a disadvantage.

Optical disks are being increased in recording capacity by increasing the numerical aperture NA of the object lenses and reducing the track pitch. Along with the higher numerical aperture NA, the depth of focus of the disk and the lens becomes shallower, uneven thickness and slight roughness of the surface of the disk substrate and roughness of the relief signal lead to an increase of focus error and cause signal noise, entering in the spot diameter of the reproduction light. The above disadvantages become particularly serious in a large capacity disk supporting a larger numerical aperture NA.

Further, the stamper used in the above method of production is processed at its inner and outer circumferences by a stamper press, lathe, etc. The circularity after the processing is about 1.5 μm at best at the inner circumference. The disk substrate obtained by inserting the stamper into the mold assembly and injection molding ends up with an offset of the disk center hole and signal portion of as much as about 30 to 70 μm with the addition of the clearance of the mold assembly etc. When the offset of the disk center hole and signal portion becomes large in this way, the crosstalk characteristic ends up deteriorating.

SUMMARY OF THE INVENTION

An object of the present invention is to provide a stamper suppressed in surface roughness, uneven thickness, deviation of circularity in inner circumference, etc., a method of producing the same, an optical recording medium produced by molding by using the stamper, and a method of producing the same.

To attain the above object, according to a first aspect of the present invention, there is provided a stamper for producing an optical recording medium used for transferring relief shapes to a surface of a medium substrate of an optical recording medium. The stamper comprises a base member, wherein one main surface thereof is mirror polished and the mirror polished main surface of the base member is formed with a relief pattern to be transferred to the medium substrate.

Preferably, the base member comprises silicon.

Alternately, preferably, the base member comprises glass.

Preferably, the base member has a thickness of 0.4 mm or more.

More preferably, the main surface on an opposite side of the mirror polished main surface of the base member is a rough surface.

Preferably, the relief shapes are a pattern of guide grooves for defining track regions of the optical recording medium.

Alternately, preferably, the relief shapes are a pattern of pits of the optical recording medium.

Since the stamper for producing an optical recording medium of the first aspect of the present invention has one main surface of a base member comprising silicon, glass, etc. mirror polished and has the mirror polished main surface of the base member formed with a relief pattern to be transferred to a medium substrate, surface roughness, uneven thickness, deviation of circularity in inner circumference, etc. are suppressed.

By using the stamper for production of an optical recording medium of the present invention, it is possible to produce an optical recording medium capable of reducing low frequency noise of a disk signal, reducing residual discrepancy of focus error, and improving the crosstalk characteristic.

According to a second aspect of the present invention, there is provided a method of producing a stamper for producing an optical recording medium used for transferring relief shapes to a surface of a medium substrate of the optical recording medium, including steps of mirror polishing one main surface of a base member; forming a resist film on the mirror polished main surface of the base member; processing the resist film in a pattern corresponding to the relief shapes; and processing the mirror polished main surface of the base member to the relief shapes by using the resist film as a mask.

Preferably, the base member comprises silicon.

Alternately, preferably, the base member comprises glass.

Preferably, the method further includes the step of grinding an inner circumference and an outer circumference of the base member using a grinding wheel rotating at a speed of at least 10,000 rpm.

More preferably, the method includes the step of grinding the circumferences using a plastic grinding wheel or a vitrified grinding wheel mixed with diamond powder in at least a finishing process of the step of grinding the inner circumference and outer circumference of the base member.

Alternately, more preferably, the method includes the step of placing a dummy plate made by the same material as the base member or a material having an equivalent hardness against at least the mirror polished main surface and co-grinds the base member and the dummy plate in the step of grinding the inner circumference and outer circumference of the base member.

The step of processing the resist film in the pattern corresponding to the relief shapes preferably includes a step of exposing a pattern on the resist film by a drawing method using a focused electron beam and a step of developing the exposed resist film.

Alternately, preferably, the step of forming on the resist film the pattern corresponding to the relief shapes includes a step of exposing a pattern on the resist film by a drawing method using an ultraviolet ray laser and a step of developing the exposed resist film.

Preferably, the step of processing the mirror polished main surface of the base member to the relief shapes using the resist film as a mask includes a step of dry etching using the resist film as a mask.

The method of producing a stamper for producing an optical recording medium of the present invention forms a resist film on a smooth surface of a base member comprising a silicon substrate smoothed by polishing etc. The resist film is exposed by a focused electron beam, ultraviolet ray laser, etc. and developed to form a pattern corresponding to the relief shapes. Next, the smooth surface of the base member is processed to the relief shapes by dry etching etc. using the resist film as a mask.

The method of producing a stamper for producing an optical recording medium of the present invention mirror polishes one main surface of a base member comprising silicon, glass, etc.; forms a resist film on the mirror polished main surface of the base member; processes the resist film in a pattern corresponding to the relief shapes; and processes the mirror polished main surface of the base member to the relief shapes using the resist film as a mask. As a result, it is possible to produce a stamper suppressed in surface roughness, uneven thickness, deviation of circularity in inner circumference, etc.

Further, by using the above stamper for producing an optical recording medium, it is possible to produce an optical recording medium capable of reducing low frequency noise of a disk signal, reducing residual discrepancy of focus error, and improving the crosstalk characteristic.

According to a third aspect of the present invention, there is provided an optical recording medium comprising a medium substrate formed by injection molding using as a part of a mold assembly a stamper for producing an optical recording medium having a base member one main surface thereof being mirror polished and the mirror polished main surface of the base member being formed with a pattern of relief shapes and thereby having the pattern of relief shapes transferred thereto; a film including at least an optical recording film formed on the relief shapes forming surface of the medium substrate; and a protective film formed on the film including the optical recording film.

Preferably, the medium substrate is formed by injection molding using as a part of a mold assembly a stamper for producing an optical recording medium having the base member comprising silicon.

Alternately, preferably, the medium substrate is formed by using as a part of a mold assembly a stamper for producing an optical recording medium having the base member comprising glass, supplying and hardening at least an ultraviolet curing resin, and thereby transferring the relief shapes of the stamper.

Preferably, the relief shapes are defined by a pattern of guide grooves for defining track regions of the optical recording medium; and the optical recording film is a phase change type optical recording medium.

Alternately, preferably, the relief shapes are defined by a pattern of guide grooves for defining track regions of the optical recording medium; and the optical recording film is a magneto-optical recording medium.

Alternately, preferably, the relief shapes are defined by a pattern of guide grooves for defining track regions of the optical recording medium; and the optical recording film comprises an organic pigment layer.

Alternately, preferably, the relief shapes are defined by a pattern of pits of the optical recording medium; and the optical recording film is a reflection film.

According to a fourth aspect of the present invention, there is provided an optical recording medium comprising a medium substrate formed by injection molding using as a part of a mold assembly a stamper for producing an optical recording medium having a base member one main surface thereof being mirror polished and the mirror polished main surface of the base member being formed with a pattern of relief shapes and thereby having the pattern of relief shapes transferred thereto; a multilayer film formed on the relief shapes forming surface of the medium substrate and comprising a plurality of films including at least an optical recording film stacked via a light transmitting layer; and a protective film for protecting the multilayer film.

Since the optical recording medium has a medium substrate formed by injection molding using as a part of a mold assembly a stamper for producing an optical recording medium having one main surface of its base member mirror polished and having the mirror polished main surface of the base member formed with a pattern of relief shapes and thereby having the pattern of relief shapes transferred to it and since the stamper is suppressed in surface roughness, uneven thickness, deviation of circularity in inner circumference, etc., an optical recording medium having this medium substrate is capable of reducing low frequency noise of a disk signal, reducing residual discrepancy of focus error, and improving the crosstalk characteristic.

It is possible to provide a single optical recording multilayer film or stack a plurality of optical recording multilayer films via light transmitting layers.

According to a fifth aspect of the present invention, there is provided a method of producing an optical recording medium having a medium substrate having relief shapes transferred to a surface thereof, including steps of mirror polishing one main surface of a base member; forming a resist film on the mirror polished main surface of the base member; processing the resist film in a pattern corresponding to the relief shapes; processing the mirror polished main surface of the base member to the relief shapes by using the resist film as a mask to form a stamper having the relief shapes transferred to the base member; forming a medium substrate having the relief shapes of the stamper transferred thereto by injection molding using the stamper as a part of a mold assembly; forming a film including at least an optical recording film on the relief shapes forming surface of the medium substrate; and forming a protective film on the film including the optical recording film.

Preferably, the base member comprises silicon.

Alternately, preferably, the base member comprises glass.

Preferably, in the step of forming a medium substrate having the relief shapes of the stamper transferred thereto, the method holds an inner circumference and outer circumference of the stamper by suction at an inside surface of the mold assembly or holds an entire main surface of an opposite side of the mirror polished main surface of the stamper by a holder provided at the inside surface of the mold assembly so as to make the stamper a part of the mold assembly.

According to a sixth aspect of the present invention, there is provided a method of producing an optical recording medium having a medium substrate having relief shapes transferred to a surface thereof, including steps of mirror polishing one main surface of a first base member; forming a first resist film on the mirror polished main surface of the first base member; processing the first resist film in a pattern corresponding to a first relief shapes; processing the mirror polished main surface of the first base member to the first relief shapes by using the first resist film as a mask to form a first stamper having the first relief shapes transferred to the first base member; mirror polishing one main surface of a second base member; forming a second resist film on the mirror polished main surface of the second base member; processing the second resist film in a pattern corresponding to a second relief shapes; processing the mirror polished main surface of the second base member to the second relief shapes by using the second resist film as a mask to form a second stamper having the second relief shapes transferred to the second base member; forming a medium substrate having first relief shapes of the first stamper transferred thereto by injection molding using the first stamper as part of a mold assembly; forming a film including at least a first optical recording film on the first relief shapes forming surface of the medium substrate; supplying an uncured resin on the film including the first optical recording film and curing the uncured resin while pressing the second stamper against the resin to form a light transmitting layer having second relief shapes of the second stamper transferred thereto; forming a film including at least a second optical recording film on the second relief shapes forming surface of the light transmitting layer; and forming a protective film on the film including the second optical recording film.

Preferably, the method includes the step of using an ultraviolet curing resin as the uncured resin for forming the light transmitting layer, and in the step of forming the light transmitting layer, irradiates the uncured resin in a space between the film including the first optical recording film of the medium substrate and the second stamper with ultraviolet rays from an outer circumference side or an inner circumference side of the second stamper so as to cure the uncured resin.

According to a seventh aspect of the present invention, there is provided a method of producing an optical recording medium having a medium substrate having relief shapes transferred to a surface thereof, including steps of mirror polishing one main surface of a first base member; forming a first resist film on the mirror polished main surface of the first base member; processing the first resist film in a pattern corresponding to a first relief shapes; processing the mirror polished main surface of the first base member to the first relief shapes by using the first resist film as a mask to form a first stamper having the first relief shapes transferred to the first base member; mirror polishing one main surface of a second base member; forming a second resist film on the mirror polished main surface of the second base member; processing the second resist film in a pattern corresponding to a second relief shapes; processing the mirror polished main surface of the second base member to the second relief shapes by using the second resist film as a mask to form a second stamper having the second relief shapes transferred to the second base member; mirror polishing one main surface of a third base member; forming a third resist film on the mirror polished main surface of the third base member; processing the third resist film in a pattern corresponding to a third relief shapes; processing the mirror polished main surface of the third base member to the third relief shapes by using the third resist film as a mask to form a third stamper having the third relief shapes transferred to the third base member; forming a medium substrate having the first relief shapes of the first stamper transferred thereto by injection molding using the first stamper as part of a mold assembly; forming a film including at least a first optical recording film on the first relief shapes forming surface of the medium substrate; supplying an uncured resin between the second stamper and the third stamper and curing the uncured resin while pressing the second stamper and the third stamper against the resin to form a light transmitting layer having the second relief shapes of the second stamper and the third relief shapes of the third stamper transferred thereto; forming a film including at least a second optical recording film on the second relief shapes forming surface of the light transmitting layer; bonding together the film including the second optical recording film and the film including the first optical recording film; forming a film including at least a third optical recording film on the third relief shapes forming surface of the light transmitting layer; and forming a protective film on the film including the third optical recording film.

Preferably, the method includes the step of using an ultraviolet curing resin as the uncured resin for forming the light transmitting layer, and in the step of forming the light transmitting layer, irradiating the uncured resin in a space between the second stamper and the third stamper with ultraviolet rays from an outer circumference side or an inner circumference side of the second stamper or the third stamper so as to cure the uncured resin.

The method of producing an optical recording medium of the present invention mirror polishes one main surface of a base member, forms a resist film on the mirror polished main surface of the base member, processes the resist film in a pattern corresponding to relief shapes, and processes the mirror polished main surface of the base member to the relief shapes using the resist film as a mask to obtain a stamper having the relief shapes transferred to the base member.

The above stamper may be used for injection molding to form a medium substrate having the relief shapes transferred to it. The stamper produced in the above way is suppressed in surface roughness, uneven thickness, deviation of circularity in inner circumference, etc., thus an optical recording medium capable of reducing low frequency noise of a disk signal, reducing residual discrepancy of focus error, and improving the crosstalk characteristic can be produced.

BRIEF DESCRIPTION OF THE DRAWINGS

These and other objects and features of the present invention will become clearer from the following description of the preferred embodiments given with reference to the attached drawings, in which:

FIG. 1 is a schematic cross-sectional view of an optical disk according to an example of the related art;

FIG. 2A is a schematic view of the configuration of a cutting apparatus (exposure apparatus), while

FIG. 3A and FIG. 3B are cross-sectional views of steps of a method of producing an optical disk according to an example of the related art, wherein FIG. 3A shows the state up to the step of producing a resist disk and FIG. 3B shows the state up to the step of patterning a resist film;

FIG. 4A and FIG. 4B are cross-sectional views of steps continuing from FIG. 3B, wherein FIG. 4A shows the state up to the step of forming a stamper and FIG. 4B shows the state up to removal of a stamper from a mold assembly;

FIG. 6A, FIG. 6B, and FIG. 6C are cross-sectional views of steps continuing from FIG. 5B, wherein FIG. 6A shows the state up to the step of forming a disk substrate, FIG. 6B shows the state up to the step of forming an optical recording film, and FIG. 6C shows the state up to the step of forming a protective film;

DESCRIPTION OF THE PREFERRED EMBODIMENTS

Below, preferred embodiments will be described with reference to the accompanying drawings.

The embodiments relate to an optical disk used as an optical recording medium, a method of producing the same, a stamper for producing an optical recording medium used in a process of producing the optical recording medium, and a method of producing the same.

First Embodiment

Figure 7A:
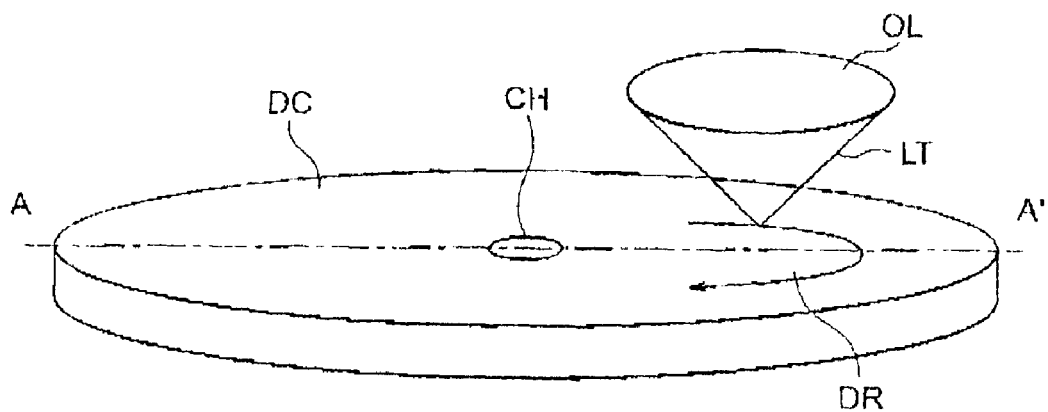
FIG. 7A is a schematic perspective view of a state of irradiating an optical disk according to the first embodiment of the present invention with light.

FIG. 7A is a schematic perspective view of a condition of irradiating an optical disk according to the present invention with light.

An optical disk DC is substantially shaped as a disk with a center hole CH formed at its center and is driven to rotate in a drive direction DR.

When recording or reproducing information, a laser light of a blue to bluish violet color region or other light LT is focused on an optical recording multilayer film in the optical disk DC by an object lens OL having a numerical aperture of for example 0.8 or more.

Figure 7B:
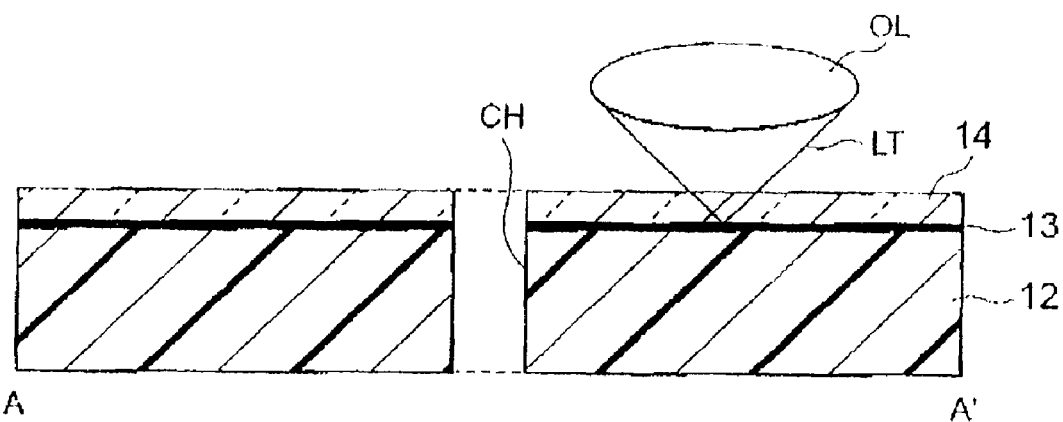
FIG. 7B is a schematic cross-sectional view.
Figure 7C:
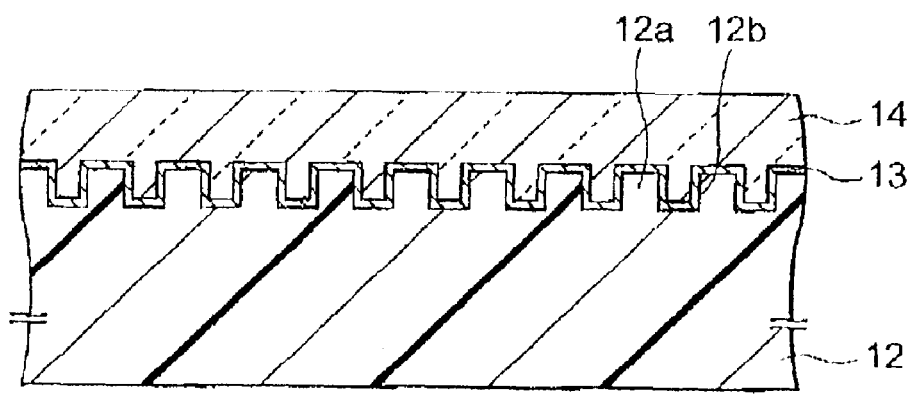
FIG. 7C is an enlarged cross-sectional view of principal parts of the schematic cross-sectional view in FIG. 7B.

FIG. 7B is a schematic cross-sectional view, while FIG. 7C is an enlarged cross-sectional view of principal portions of the schematic cross-sectional view in FIG. 7B.

One surface of a disk substrate 12 having a thickness of about 1.1 mm and comprising polycarbonate, is provided with projecting regions 12a and recessed regions 12b defining track regions. That surface is further formed with an optical recording multilayer film 13 comprising for example a reflection film, a dielectric film, a recording film, another dielectric film, etc. stacked in that order. The configuration and the number of layers of the optical recording multilayer film 13 differ in accordance with the type of recording material and design.

The recording film includes for example a phase change type recording film, magneto-optical recording film, or organic pigment-containing recording film.

Further, a light transmitting protective film 14 having a thickness of 0.1 mm is formed on the optical recording multilayer film 13.

When recording or reproducing information on or from the above optical disk, the object lens OL focuses a laser light or other light LT on the optical recording multilayer film 13 from the protective film 14 side.

At the time of reproducing information from the optical disk, a light receiving element receives the return light reflected at the optical recording multilayer film 13, and a signal processing circuit generates a predetermined signal to give a reproduction signal.

In the above optical disk, the optical recording multilayer film 13 also has relief shapes corresponding to the projecting regions 12a and recessed regions 12b provided on the one surface of the disk substrate 12. The projecting regions 12a and recessed regions 12b define the track regions.

The projecting regions 12a are referred as "lands", which are projecting to the protective film 14 side when viewed from the disk substrate 12 side, while recessed regions 12b are referred as "grooves".

It is possible to record information both at the lands and the grooves or use only one of the lands and grooves as recording regions.

Here, the groove pitch is for example about 200 nm, and the widths of the lands and grooves are for example about 100 nm (80 to 120 nm).

Further, by forming pits having lengths corresponding to the recorded data as the relief shapes of the disk substrate 12 and by using an aluminum film or other reflection film as an optical recording film, it is possible to obtain a read only (ROM) type optical disk.

A method of producing the above optical disk will be explained next.

Figure 8:
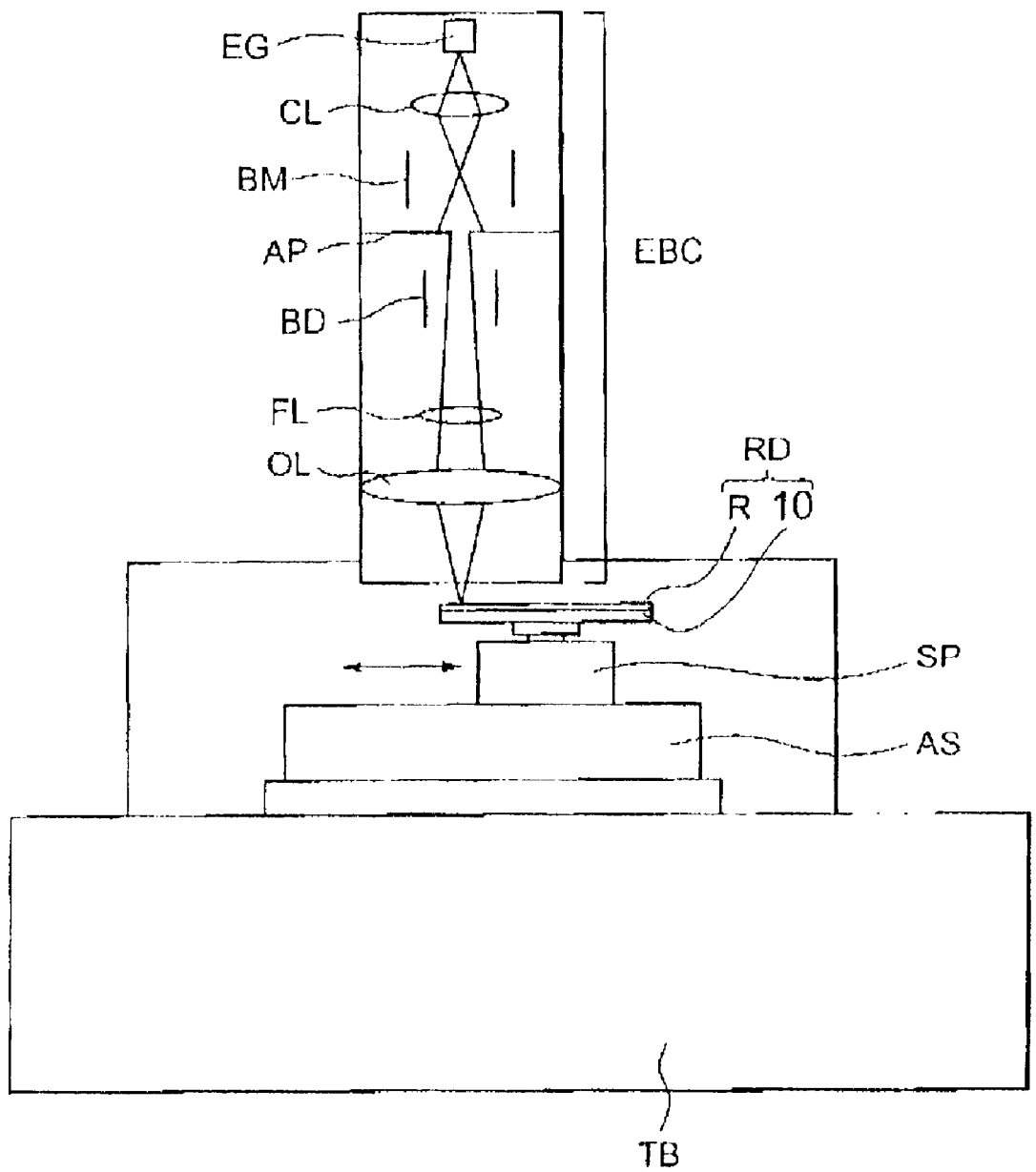
FIG. 8 is a schematic view of the configuration of an electron beam drawing system.

FIG. 8 is a schematic view of the configuration of an electron beam drawing system used in the method of production of an optical disk of the present embodiment.

An electron gun EG, a condensing lens CL, a beam modulator (blanking portion) BM, an aperture AP, a beam deflector BD, a focus lens FL, and an object lens OL are arranged at predetermined positions in an electron beam column EBC.

The object of exposure by the electron beam, that is, a resist disk RD comprising a silicon substrate 10 formed with a resist film R, is arranged on an air slide AS near an electron beam emission hole of the electron beam column EBC and is chucked on a spindle rotated at a high speed by a spindle motor.

The entire electron bean drawing system is placed on a vibration isolation table TB.

The electron gun EG is for example a thermoelectric field emission type electron gun giving an electron beam having a high luminance. An electron beam emitted from the electron gun EG and accelerated is subjected to high speed blanking (on/off control) by the beam modulator BM in the electron beam column EBC held at a vacuum and is condensed and focused by the condensing lens CL and object lens OL comprising electromagnetic lenses etc. on the surface of the silicon substrate 10 formed with the resist film R (resist disk RD).

For example, a diameter of the focused electron beam is set to about 80 nm which is half the width of the Gaussian distribution, while a probe current is set to 150 nA.

It is possible to expose a spiral pattern by firing the electron beam while driving the high speed rotating resist disk RD in the radial direction of the resist disk RD.

As a resist film, for example, a positive chemical amplification type resist, acrylic resin type resist for electron beam use, etc. can be used.

The exposed resist disk is developed by an alkali solution or an exclusive developing solution to a pattern wherein portions irradiated by the electron beam are dissolved away in the case of a positive type resist.

By suitably setting conditions of exposure and development, a pattern having a pitch of about 200 nm and a line width of 80 nm equal to the electron beam diameter can be formed.

Figure 9A:
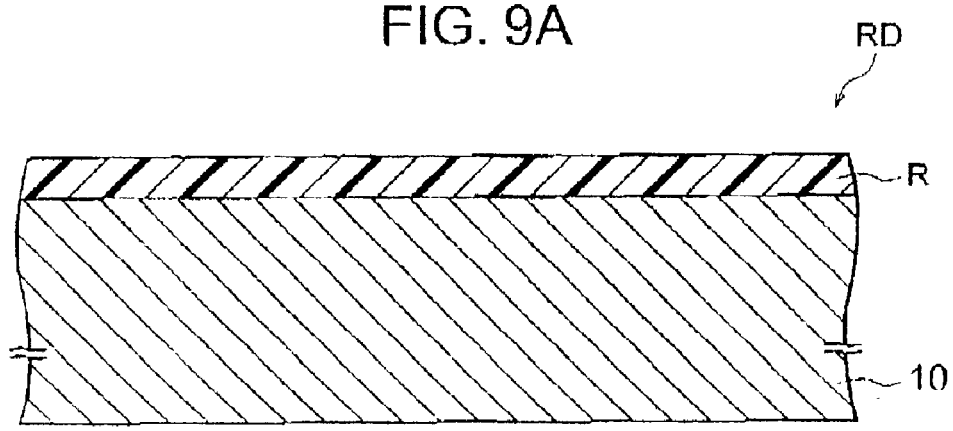
FIG. 9 is a cross-sectional view of steps of a method of production of an optical disk according to the first embodiment of the present invention.

The electron beam drawing system may be used to produce a stamper and this may be used to produce an optical disk as follows:

First, as shown in FIG. 9A, a resist disk RD comprising a silicon substrate 10 formed with a resist film R is prepared.

As the silicon substrate 10, for example a wafer having a diameter of 200 mm, a thickness of 725 $\mu$m, and a mirror polished surface is used. A silicon substrate 10 having a flatness of a grade of for example about 1 $\mu$m in terms of the total thickness variation (TTV) value is used.

The other surface of the silicon substrate 10 is for example made rough like as a pebbled surface by a chemical or physical method.

Alternately, it is possible to use a resist disk RD comprising a glass substrate mirror polished on one surface and formed with a resist.

Further, the resist film R is formed using for example a positive type chemical amplitude type resist or acrylic resin type exclusive resist for electron beam uniformly to a thickness of about 100 nm by spin coating or other.

Figure 9B:
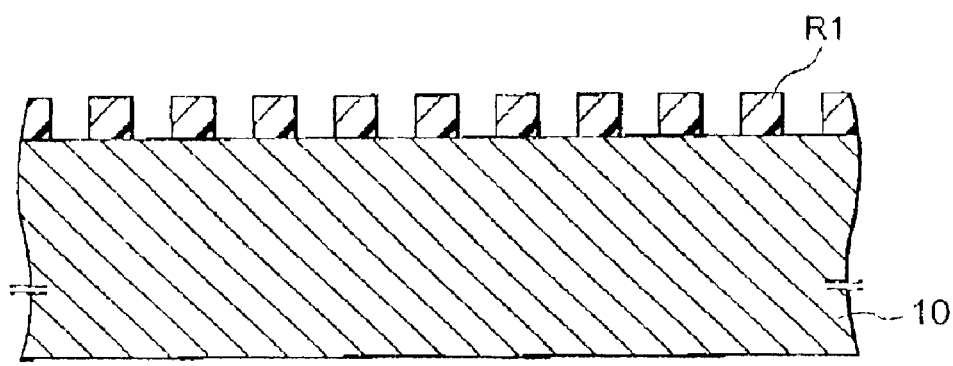

Next, the electron beam drawing system shown in FIG. 8 is used to expose the resist film R by a pattern photosensitizing regions for forming projecting regions (lands) of the disk substrate or regions for forming pits on the disk substrate. This is developed by an exclusive developing solution to obtain a pattern of the resist film R1 opened at regions for forming the projecting regions of the disk substrate (lands) or regions for forming the pits as shown in FIG. 9B.

By using the electron beam drawing system, the pattern of the resist film R1 may be made a spiral pattern having a pitch of about 200 nm and a width remaining as a resist film R1 and opening width of about 100 nm (80 to 120 nm) or an equally fine pit pattern.

Figure 9C:
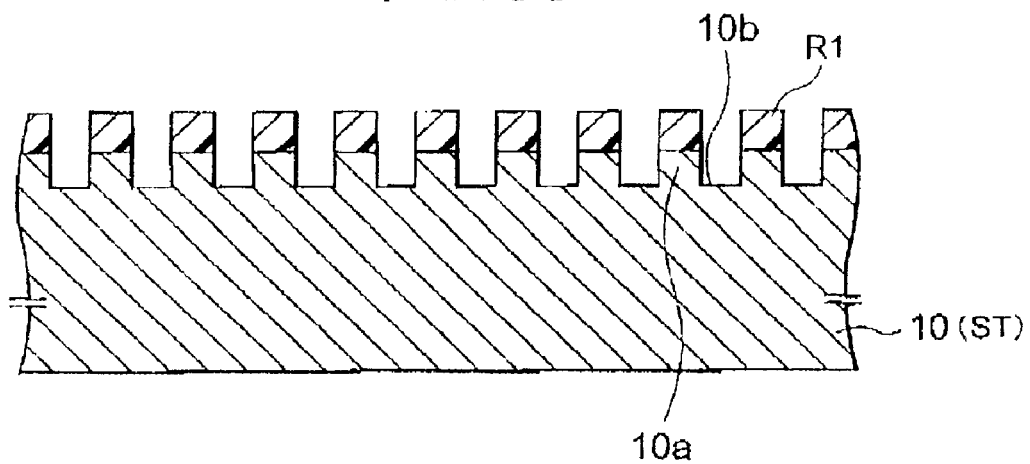

Next, as shown in FIG. 9C, dry etching etc. is performed by using the resist film R1 as a mask to transfer the pattern of the resist film R1 to the silicon substrate 10, so that the side walls become substantially vertical. As the etching gas at this time, for example a chloride-based gas ($Cl_2$ etc.) is used. Ions of the etching gas generated in plasma strike the surface of the resist disk perpendicularly for etching in the so-called reactive ion etching (RIE) mode.

As a result, the surface of the silicon substrate 10 is formed with relief shapes comprising recessed regions 10b and projecting regions 10a between each two recessed regions 10b. It is a pattern of for example recessed regions 10b having a depth of 70 nm and a line width of 80 nm.

Next, the remaining resist film R1 is removed by oxygen plasma ashing etc.

Due to the above, a stamper ST having the silicon substrate 10 or a glass substrate as its base member can be produced.

Next, a three-dimensional fine processing system is used to process the silicon substrate 10 to the shape of the inner and outer circumference of the disk.

At this time, the surface formed with the relief shapes is formed with a not shown thin protective film to protect it against scratches and dirt and to facilitate peeling at the time of molding the disk.

Next, a dummy plate of the same material as the silicon substrate 10 or a material having equal hardness is placed against on the relief shapes forming surface to prevent the processed end faces from being damaged or more preferably the silicon substrate 10 is sandwiched between two dummy plates, and the silicon substrate 10 and the dummy plates are co-ground in that state to shape the inner and outer circumferences.

In the case of using a glass substrate, a dummy plate of glass material or a material having equal hardness is used to perform like above.

In the shaping of the inner and outer circumference shaping by the above three-dimensional fine processing system, a plastic grinding wheel or a vitrified grinding wheel mixed with diamond powder is used to grind the circumferences while rotating at a speed of 10,000 rpm or more at least in the final finishing process. Due to this, damage to the processed end faces can be kept to a minimum.

Figure 10A:
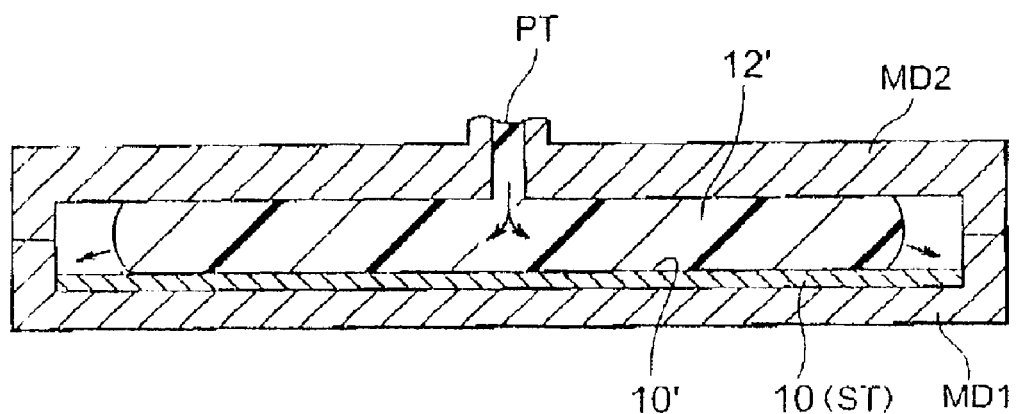
FIG. 10A is a schematic view and FIG. 10B is a cross-sectional view of an injection molding step continuing from FIG. 9.

Next, as shown in FIG. 10A, the obtained stamper ST having the silicon substrate 10 as a base member is fixed in a cavity comprising the upper and lower molds MD1 and MD2 to form a mold assembly for injection molding.

At this time, the stamper ST is arranged so that its relief shapes forming surface 10' faces the inside of the cavity.

Here, the stamper ST is fixed inside the cavity formed by the molds MD1 and MD2 by holding the inner circumference and outer circumference of the stamper ST by suction on the inner surface of the cavity. Alternately, the entire main surface on the opposite side of the mirror polished main surface of the stamper ST as a whole is held by suction holes, grooves, or other holding mechanisms provided at a stamper mounting top plate at the inner surface of the cavity.

Figure 10B:
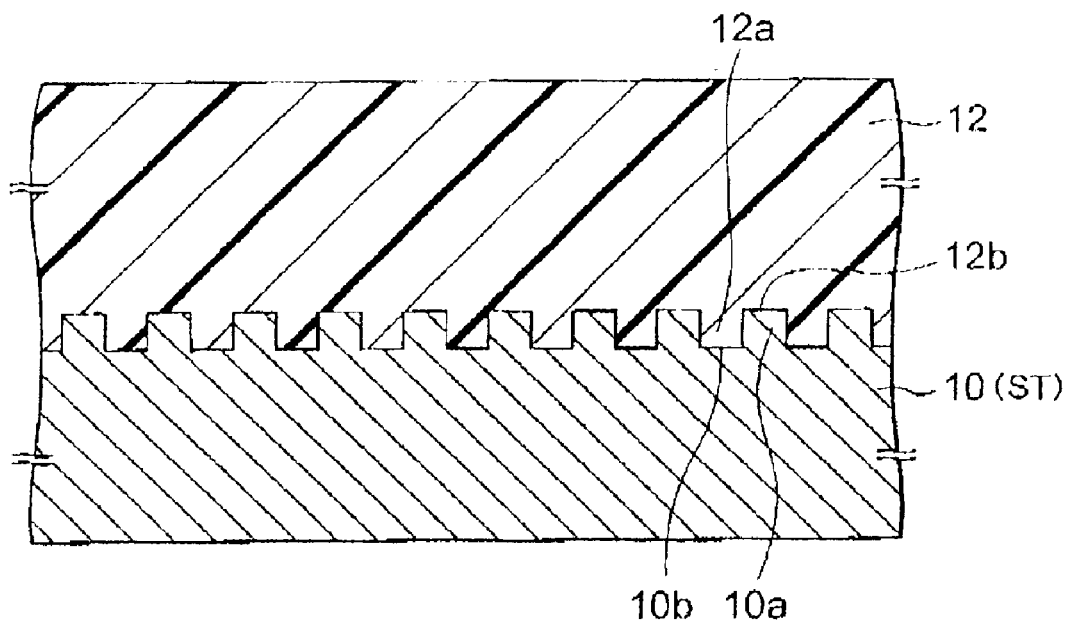

By injecting into the cavity of the above injection molding mold assembly a polycarbonate, an amorphous polyolefin, or other resin 12' in the molten state from a charging port PT of the mold assembly, a disk substrate 12 is formed on the relief pattern of the stamper ST as shown in FIG. 10B.

Here, the surface of the disk substrate 12 is formed with projecting regions 12a by transfer of an inverse pattern of relief shapes from the recessed regions 10b on the surface of the stamper ST, while is formed with recessed regions 12b by transfer of an inverse pattern of relief shapes from the projecting regions 10a of the stamper ST.

Figure 11A:
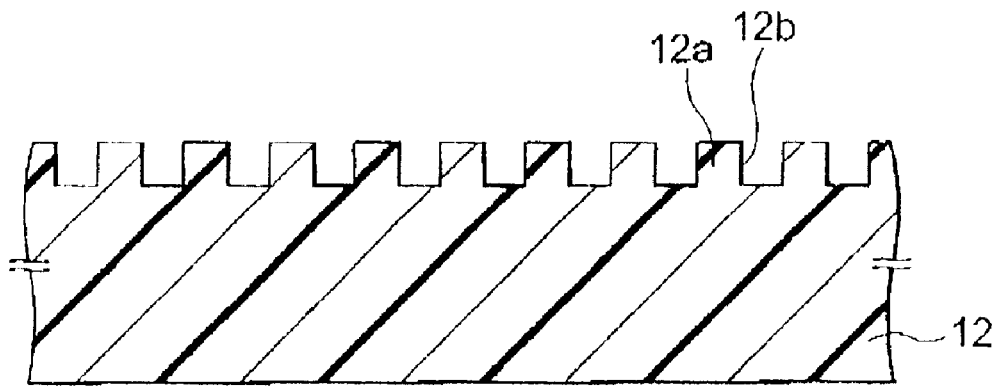
FIG. 11 is a cross-sectional view of a step continuing from FIG. 10.

By removing the substrate from the above injection molding mold assembly, a disk substrate 12 formed with the projecting regions 12a and recessed regions 12b for forming a groove pattern or pit pattern as shown in FIG. 11A is obtained.

Figure 11B:
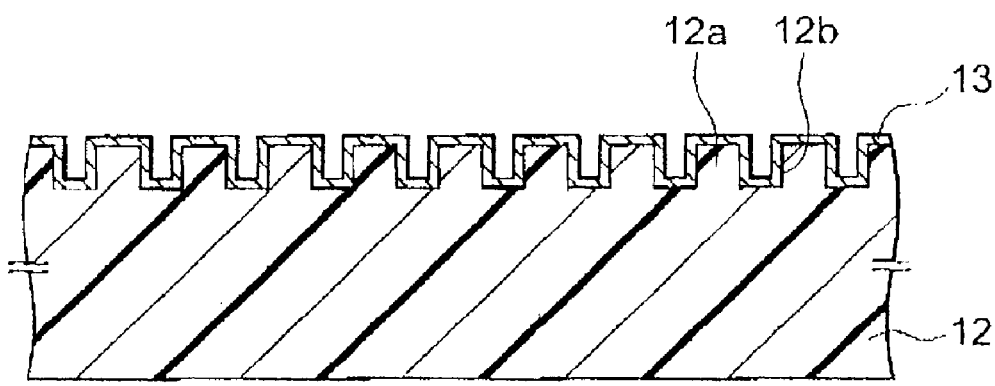

Next, as shown in FIG. 11B, the surface of the disk substrate 12 is swept with air, nitrogen gas, or another gas to remove dust, then is successively formed with a reflection film, a dielectric film, a recording film, and another dielectric film in that order by, for example, sputtering, to form the optical recording multilayer film 13.

As the above recording film, for example, a phase change type optical recording film, magneto-optic recording film, or organic pigment-containing recording film can be used.

Alternately, in the case of a ROM type optical disk, the optical recording film is formed by an aluminum film or other reflection film.

Figure 11C:
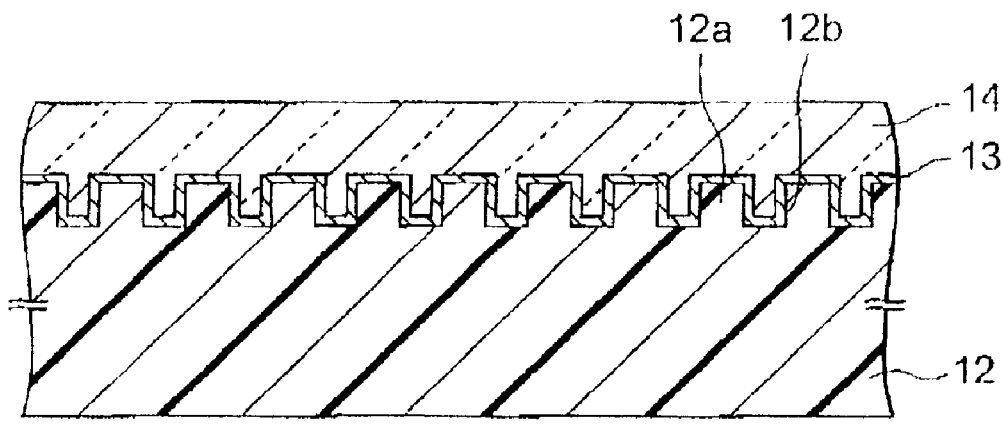

Next, as shown in FIG. 11C, an ultraviolet curing resin etc. is coated on the optical recording multilayer film 13 and cured to form a light transmitting protective film 14. Alternately, it is possible to bond a film for use as the protective film by an adhesive layer to obtain the protective film.

Due to the above, an optical disk having the structure shown in FIG. 7A to FIG. 7C can be produced.

In the above method of producing an optical disk of the present embodiment, the silicon substrate used as a stamper has high rigidity and durability, so is suitable as a stamper material.

The stamper according to the present embodiment is a stamper having one main surface of the base member made by silicon, glass, etc. mirror polished, having the mirror polished main surface of the base member formed with a relief pattern to be transferred to the disk substrate, and suppressed in surface roughness, uneven thickness, and deviation of circularity in inner circumference.

Further, the optical disk according to the present embodiment produced by the stamper is capable of reducing low frequency noise of a disk signal and reducing residual discrepancy of focus error and is able to be produced by using a stamper having almost no damage at processed end faces, excellent circularity in processing, and small offset, so there is less offset of tracks and the crosstalk characteristic can be improved.

As a result, mass production of high density optical disks capable of supporting larger recording capacities becomes possible.

Further, in the method of production according to the present embodiment, electroplating, which used to require a long time, becomes unnecessary for preparing a stamper and, furthermore, treatment of the plating waste solution becomes unnecessary.

Second Embodiment

Figure 12A:
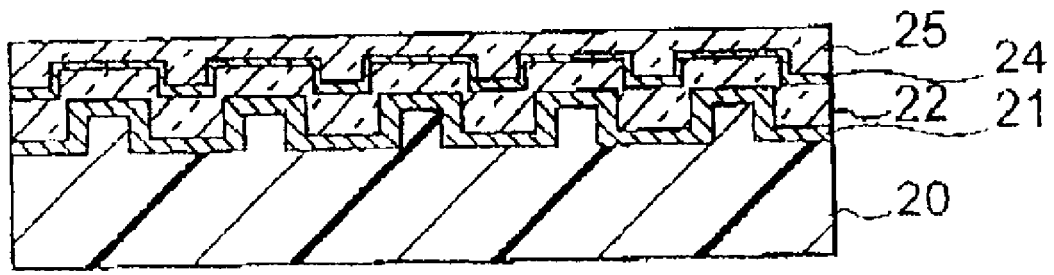
FIG. 12A and FIG. 12B are schematic cross-sectional views of an optical disk according to a second embodiment.

FIG. 12A is a schematic cross-sectional view of an optical disk of a second embodiment.

One surface of a disk substrate 20 having a thickness of about 1.1 mm and comprising polycarbonate is formed with projecting regions and recessed regions defining track regions. For example, a reflection film, a dielectric film, a recording film, another dielectric film, etc. are stacked in this order on this surface to form a first optical recording multilayer film 21. The configuration and number of layers of the first optical recording multilayer film 21 differ according to the type of the recording material and design. The above recording film includes for example a phase change type recording film, a magneto-optical recording film, and an organic pigment-containing recording film.

Further, over the first optical recording multilayer film 21 a second optical recording multilayer film 24 is formed via a light transmitting layer 22 comprising an ultraviolet curing resin etc. The second optical recording multilayer film 24 has a similar layer configuration as the first optical recording multilayer film 21 and has relief shapes defining track regions.

Over the second optical recording multilayer film 24 a light transmitting protective film 25 having a thickness of 0.1 mm and made by an ultraviolet curing resin etc is formed.

Figure 12B:
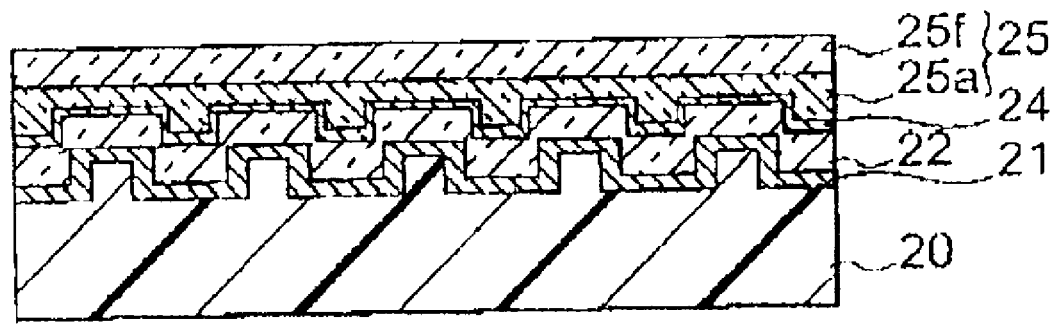

Further, as shown in FIG. 12B, the light transmitting protective film 25 may be configured by bonding a film for use as the protective film 25f using an adhesive layer 25a.

When recording or reproducing information on or from the above optical disk, in the same way as in the optical disk of the first embodiment, a laser light or other light is focused by an object lens on the first optical recording multilayer film 21 or second optical recording multilayer film 24 from the protective film 25 side.

At this time, by focusing it on either the first optical recording multilayer film 21 or second optical recording multilayer film 24, information is recorded or reproduced selectively on or from either the first optical recording multilayer film 21 or second optical recording multilayer film 24.

Here, the reflectance of the first optical recording multilayer film 21 is for example about 80 to 90%, at least the second optical recording multilayer film 24 is translucent (for example, has a reflectance of about 15 to 30%), and light is passed through the second optical recording multilayer film 24 when irradiating the first optical recording multilayer film 21.

At the time of reproducing information from the optical disk, a light receiving element receives return light reflected at the first or second optical recording multilayer film, and a signal processing signal generates a predetermined signal to give a reproduction signal.

Next, a press machine for forming a light transmitting layer having relief shapes transferred to its surface and used in a method of producing an optical disk of the present embodiment will be explained.

Figure 13:
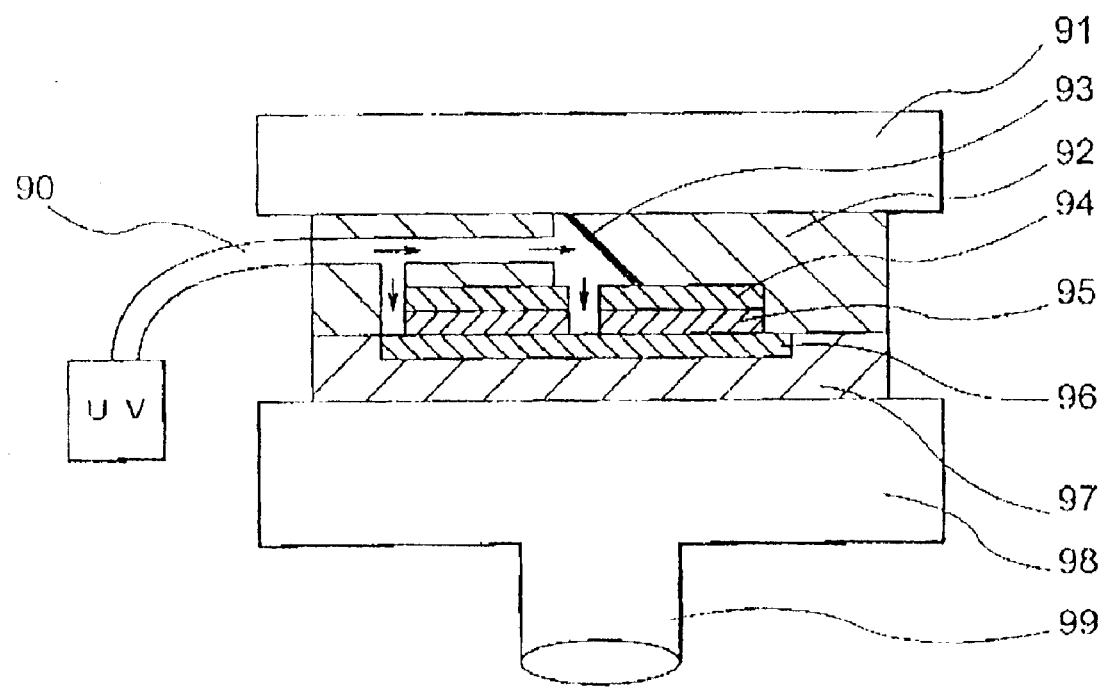
FIG. 13 is a schematic view of the configuration of a press machine used in the present invention.

FIG. 13 is a schematic view of the configuration of the above press machine.

The press machine comprises an ultraviolet ray guide path 90, a press top platen 91, an upper mold 92, a reflection mirror 93, a lower mold 97, a press bottom platen 98, and a hydraulic ram 99. A cavity is formed by the upper mold 92 and the lower mold 97.

In this cavity, a disk substrate 96 produced by the same steps as in the method of production explained in the first embodiment and formed in advance with a first optical recording multilayer film (not shown) is fixed to the lower mold 97 by suction holding etc. while positioning it by centering pins etc. so that the signal surface faces the inside of the cavity.

On the other hand, a glass stamper 94 produced by the same steps as in the method of production explained in the first embodiment is fixed to the upper mold 92 by suction while positioning it by centering pins etc. so that the signal surface faces the inside of the cavity.

An ultraviolet curing resin 95 is supplied to the space between the disk substrate 96 and the glass stamper 94 by a dispenser etc.

The press bottom platen 98 is driven to move vertically in the figure by the hydraulic ram 99 or an air cylinder able to be controlled in position by a linear encoder, can be set in pressing speed by two or more levels at any set position in the pressing process, and operates together with an irradiation switch of an external ultraviolet ray apparatus UV at a specific pressing position.

Ultraviolet rays of a high pressure mercury vapor lamp having a wavelength of 230 to 450 nm high in curing efficiency of an ultraviolet curing resin are emitted from the ultraviolet ray apparatus UV and guided to the upper mold 92 by the ultraviolet ray guide path 90 formed by an optical fiber etc.

Here, the upper mold 92 and the centering pins provided in the upper mold 92 are structured so that the ultraviolet rays guided from the outside are irradiated from the center hole to an inner circumferential portion of the cavity via the reflection mirror 93 inside the centering pins. Further, an outer circumferential portion is similarly structured. Due to this structure, the ultraviolet rays guided from the outside can strike the glass stamper 94 from the inner circumferential portion and the outer circumferential portion in the state with mold assembly closed.

In the press machine having the mold assembly of the above structure, when for example the ultraviolet curing resin layer becomes a desired thickness of for example about 20 to 40 $\mu$m, namely, when the upper and lower molds reach positions corresponding to the above thickness, the ultraviolet rays start to be irradiated. The irradiation time can be set by a timer.

Using the press configured as above, the ultraviolet curing resin having a desired thickness can be cured to form a light transmitting layer in the space between the disk substrate 96 and the glass stamper 94.

Next, a method of producing an optical disk according to the present embodiment will be explained.

First, in the same way as in the method explained in the first embodiment, a disk substrate 20 having a relief pattern on its surface is formed by using a stamper formed from a base member having a mirror polished surface, and a first optical recording multilayer film 21 is formed above it.

Figure 14A:
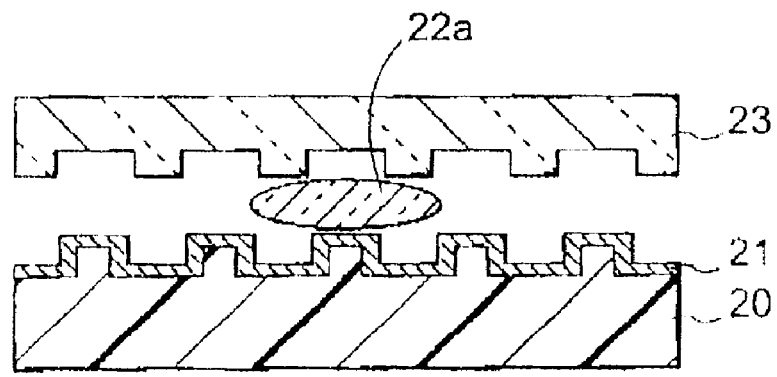
FIG. 14 is a cross-sectional view of steps of a method of production of an optical disk according to the second embodiment.

Next, as shown in FIG. 14A, an ultraviolet curing resin 22a is supplied on the first optical recording multilayer film 21 in the upper and lower molds of the above press machine. A glass stamper 23 having a relief pattern for the second optical recording multilayer film formed in the same way as in the method explained in the first embodiment is arranged above it.

Figure 14B:
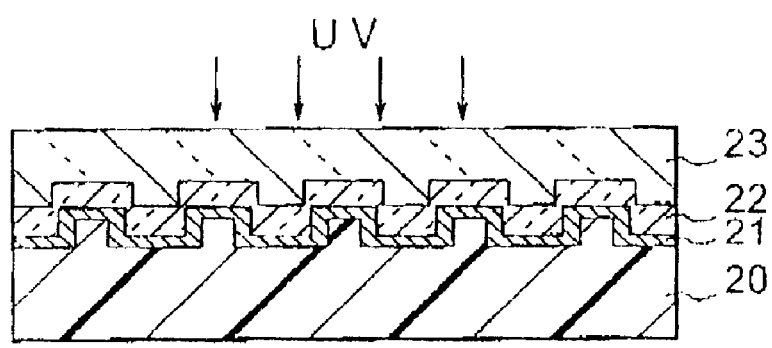

Next, as shown in FIG. 14B, ultraviolet rays are irradiated in the upper and lower molds of the above press machine at the point of time to cure the ultraviolet curing resin 22a when the layer of the ultraviolet curing resin becomes the desired thickness and thereby obtain the light transmitting layer 22.

Figure 14C:
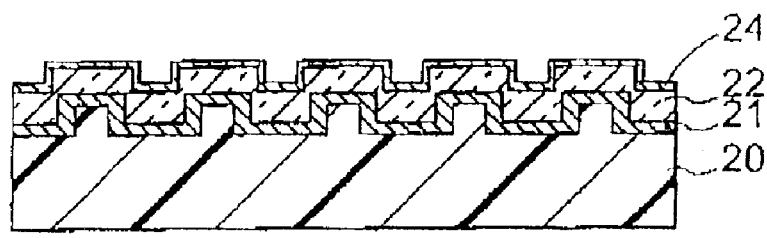

Next, as shown in FIG. 14C, the light transmitting layer 22 and the glass stamper 23 are separated at their interface whereby the second optical recording multilayer film 24 is formed on the relief pattern transferred from the glass stamper 23 of the light transmitting layer 22.

Next, a light transmitting protective film 25 having a thickness of 0.1 mm comprising an ultraviolet curing resin etc. is formed over the second optical recording multilayer film 24 or a film for use as the protective film 25f is bonded by an adhesive layer 25a to form the optical disk having the configuration shown in FIG. 12A and FIG. 12B.

In the method of production of the optical disk of the present embodiment, the stamper used for forming the disk substrate or the light transmitting layer is a stamper having a base member comprising transmitting light glass etc. and mirror polished on one main surface, having the mirror polished main surface of the base member formed with a relief pattern to be transferred to the disk substrate or other, and suppressing surface roughness, uneven thickness, deviation of circularity in inner circumference, etc.

Further, the optical disk according to the present embodiment produced by using the above stamper is capable of reducing low frequency noise of a disk signal, reducing residual discrepancy of focus error, and improving the crosstalk characteristic.

Third Embodiment

Figure 15A:
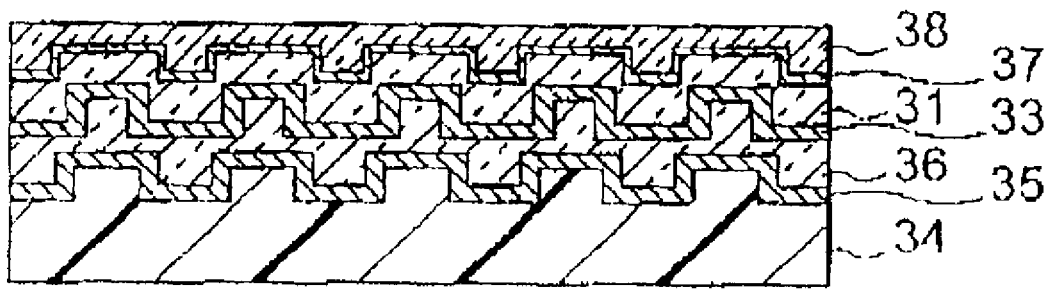
FIG. 15A and FIG. 15B are schematic cross-sectional views of an optical disk of a third embodiment.

FIG. 15A is a schematic cross-sectional view of an optical disk according to a third embodiment.

One surface of a disk substrate 34 having a thickness of about 1.1 mm comprising polycarbonate etc. is provided with projecting regions and recessed regions defining track regions. For example, a reflection film, a dielectric film, a recording film, another dielectric film, etc. are stacked in that order on this surface to form a first optical recording multilayer film 35. The configuration and number of layers of the first optical recording multilayer film 35 differ according to the type of recording material and design. The above recording film includes for example a phase change type recording film, a magneto-optical recording film, an organic pigment-containing recording film.

Further, over the first optical recording multilayer film 35 a second optical recording multilayer film 33 is formed via a light transmitting layer 36 comprising an ultraviolet curing resin etc. The second optical recording multilayer film 33 has the same layer configuration as the first optical recording multilayer film 35 and has relief shapes defining track regions.

Further, over the second optical recording multilayer film 33 a third optical recording multilayer film 37 is formed via a light transmitting layer 31 comprising an ultraviolet curing resin etc. The third optical recording multilayer film 37 has the same layer configuration as the first optical recording multilayer film 35 and has relief shapes defining track regions.

Over the third optical recording multilayer film 37 a light transmitting protective film 38 having a thickness of 0.1 mm comprising an ultraviolet curing resin etc is formed.

Figure 15B:
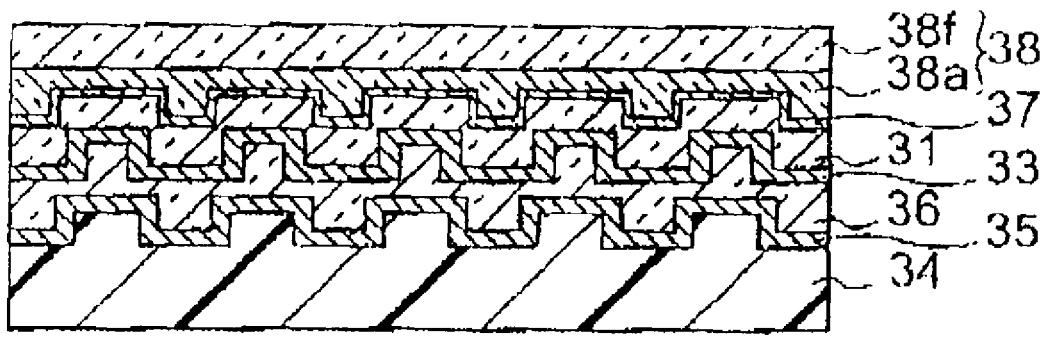

Further, as shown in FIG. 15B, the light transmitting protective film 38 may be configured by bonding a film for use as the protective film 38f by an adhesive layer 38a.

When recording or reproducing information on or from the above optical disk, in the same way as in the optical disk of the first embodiment, a laser light or other light is focused from an object lens to the first optical recording multilayer film 35, second optical recording multilayer film 33, or third optical recording multilayer film 37 from the protective film 38 side.

At this time, by focusing it on either of the first optical recording multilayer film 35, second optical recording multilayer film 33, or third optical recording multilayer film 37, recording or reproducing is selectively performed on or from any one of them.

Here, the reflectance of the first optical recording multilayer film 35 is for example about 80 to 90%, while the second optical recording multilayer film 33 and third optical recording multilayer film 37 are translucent (for example, the second optical recording multilayer film 33 has a reflectance of about 30%, and the third optical recording multilayer film 37 has a reflectance of about 15%). The nearer the layer to the light transmitting protective film, the lower the reflectance. When focusing light on the first optical recording multilayer film 35, the light is passed through the second optical recording multilayer film 33 and third optical recording multilayer film 37. When focusing light on the second optical recording multilayer film 33, the light is passed through the third optical recording multilayer film 37.

At the time of reproducing information from the optical disk, a light receiving element receives the return light reflected at the first, second, or third optical recording multilayer film, and a signal processing circuit generates a predetermined signal to give a reproduction signal.

Next, a method of producing an optical disk according to the present embodiment will be explained.

Figure 16A:
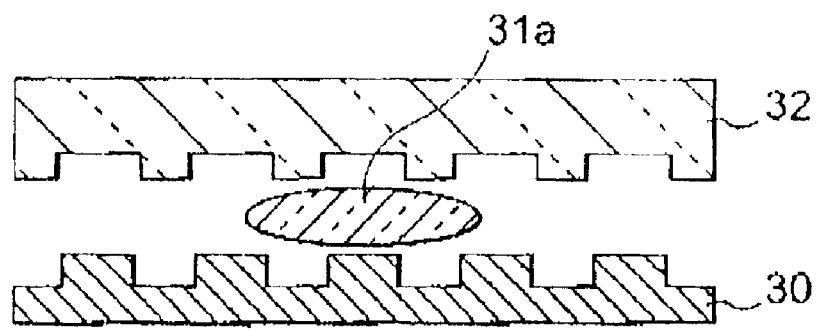
FIG. 16A to FIG. 16C are cross-sectional views of steps of a method of production of an optical disk according to a third embodiment of the present invention.

First, as shown in FIG. 16A, in the upper and lower molds of the press machine explained in the second embodiment, a stamper 30 having a relief pattern for the second optical recording multilayer film is arranged in the lower mold, an ultraviolet curing resin 31a is supplied over the stamper 30, and a glass stamper 32 having a relief pattern for the third optical recording multilayer film is arranged in the upper mold. As the stamper 30 and the glass stamper 32, ones produced in the same way as explained in the first embodiment are used.

Figure 16B:
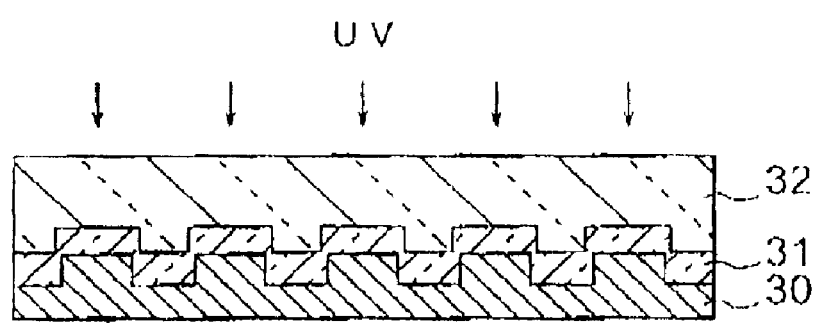

Next, as shown in FIG. 16B, ultraviolet rays are irradiated in the upper and lower molds of the above press to cure the ultraviolet curing resin 31a at the point of time when the layer of the ultraviolet curing resin 31a becomes the desired thickness to obtain the light transmitting layer 31.

Figure 16C:
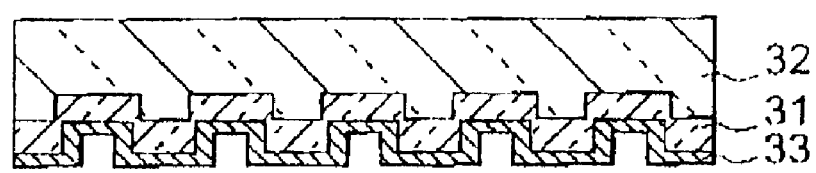

Next, as shown in FIG. 16C, the light transmitting layer 31 and the stamper 30 are separated at their interface whereby the second optical recording multilayer film 33 is formed on the relief pattern transferred from the stamper 30.

Next, by another step, in the same way as in the method explained in the first embodiment, a stamper formed from a base member comprising silicon and having a mirror polished surface is used to form a disk substrate 34 having a relief pattern on its surface and form the first optical recording multilayer film 35 above it.

Figure 17A:
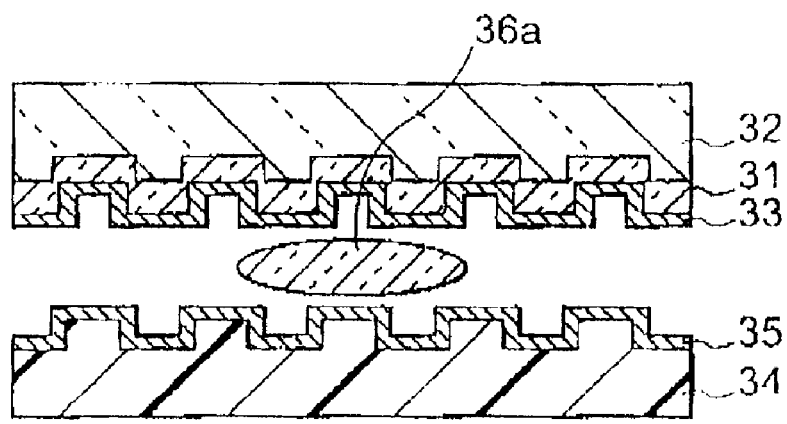
FIG. 17A to FIG. 17C are cross-sectional views of steps continuing from FIG. 16C.

Next, as shown in FIG. 17A, in the upper and lower molds of the press machine explained in the second embodiment, a disk substrate 34 formed with the first optical recording multilayer film 35 is arranged in the lower mold, an ultraviolet curing resin 36a is supplied on the first optical recording multilayer film 35, and a glass stamper 32 formed with the above light transmitting layer 31 and second optical recording multilayer film 33 is arranged in the upper mold.

Next, ultraviolet rays are irradiated in the upper and lower molds of the above press to cure the ultraviolet curing resin 36a at the point of time when the layer of the ultraviolet curing resin 36a becomes the desired thickness to obtain the light transmitting layer 36.

Figure 17B:
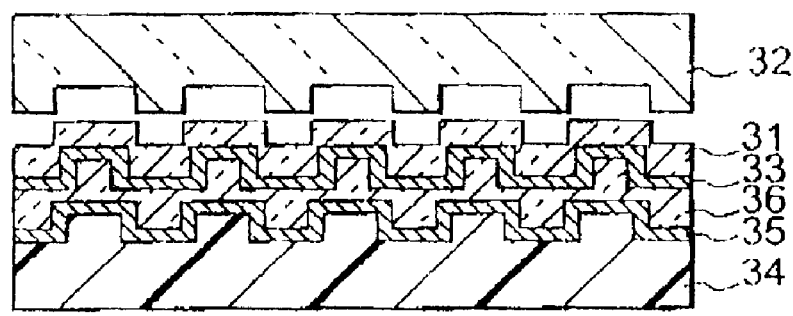
Figure 17C:
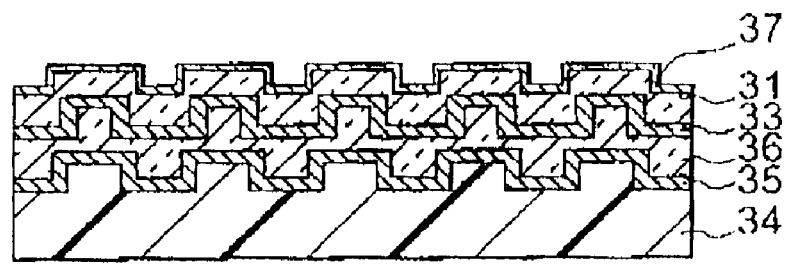

Next, as shown in FIG. 17B, the light transmitting layer 31 and the glass stamper 32 are separated at their interface whereby the third optical recording multilayer film 37 is formed on the relief pattern transferred from the glass stamper 32 of the light transmitting layer 31 as shown in FIG. 17C.

Next, a light transmitting protective film 38 having a thickness of 0.1 mm comprising an ultraviolet curing resin etc. is formed over the third optical recording multilayer film 37 or a film for use as the protective film 38f is bonded by an adhesive layer 38a to form the optical disk having the configuration shown in FIG. 15A and FIG. 15B.

In the method of production of the optical disk of the present embodiment, the stamper used for forming the disk substrate or the light transmitting layer is a stamper having a base member comprising glass etc. and mirror polished on one main surface, having the mirror polished main surface of the base member formed with a relief pattern to be transferred to the disk substrate or other, and suppressing surface roughness, uneven thickness, deviation of circularity in inner circumference, etc.

Further, the optical disk according to the present embodiment produced by using the above stamper is capable of reducing low frequency noise of a disk signal, reducing residual discrepancy of focus error, and improving the crosstalk characteristic.

EXAMPLE 1

A silicon substrate having a diameter of 200 mm, a thickness of 0.67 mm, and a mirror polished surface was used to prepare a stamper of a silicon substrate in accordance with the first embodiment.

Namely, a resist film (TSMR-V50 produced by Tokyo Ohka Kogyo Co., Ltd.) was formed on the silicon substrate to a thickness of 45 nm by spin coating, dried, exposed by laser at regions for forming grooves, developed by an inorganic alkali developing solution (DE-4 produced by Tokyo Ohka Kogyo Co., Ltd.) for 15 to 30 seconds, and removed at not exposed portions.

Next, reactive ion etching (RIE) was performed using the above resist film as a mask to form grooves having a depth of 40 nm, then the resist film was removed to thereby obtain a silicon stamper.

Here, the reactive ion etching (RIE) was performed under conditions of an RF power of 200 W, an etching gas of $CF_4$, a pressure of 1 Pa, a gas flow rate of 50 sccm, and a silicon substrate temperature of 20° C. at an etching speed of 20 nm/min for 2 minutes.

The signal surface of the obtained silicon substrate was coated with a protective film material (Clean Coat S made by Fine Chemical Japan Co., Ltd.) This was dried to form a protective film. A double column structure three dimensional fine processor and diamond-containing plastic grinding wheel (Diamond Resin or, when also used for rough grinding, Vitrified Diamond S type made by FSK Co., Ltd.) were used to grind the inner and outer circumferential shapes by helical grinding. The grinding was performed by a total of four steps: rough grinding I, rough grinding II, finishing I, and finishing II. The conditions of the configurations (spindle speed, XY-axial movement, Z-axial movement, and cutting feed) were as shown in Table 1.

TABLE 1

|  | Rough grinding I | Rough grinding II | Finishing I | Finishing II |
|---|---|---|---|---|
| Spindle speed (rpm) | 20,000 | 25,000 | 30,000 | 30,000 |
| XY-axial movement (mm) | Cut off | 0.1 | 0.02 | 0.005 |
| Z-axial movement (mm) | 0.02 | 2.9 | 2.9 | 2.0 |
| Cutting feed (mm/min) | 200 | 20 | 10.0 | 4.0 |

The obtained silicon substrate stamper was inserted into an injection molding mold assembly of an injection molding machine having a maximum clamping force of 30 tons and a disk substrate having a diameter of 120 mm and a thickness of 1.2 mm was formed by an amorphous polyolefin resin (ZEONOR 1600 made by Nippon Zeon Co., Ltd.)

The conditions of the injection molding step were an average injection speed of 150 mm/sec, a maximum clamping force of 15 tons, a resin melting temperature of 370° C., a mold assembly temperature of 130° C., and a cooling time of 14 seconds.

The noise level of the low frequency region at the mirror surface of the obtained disk substrate was measured.

Figure 18:
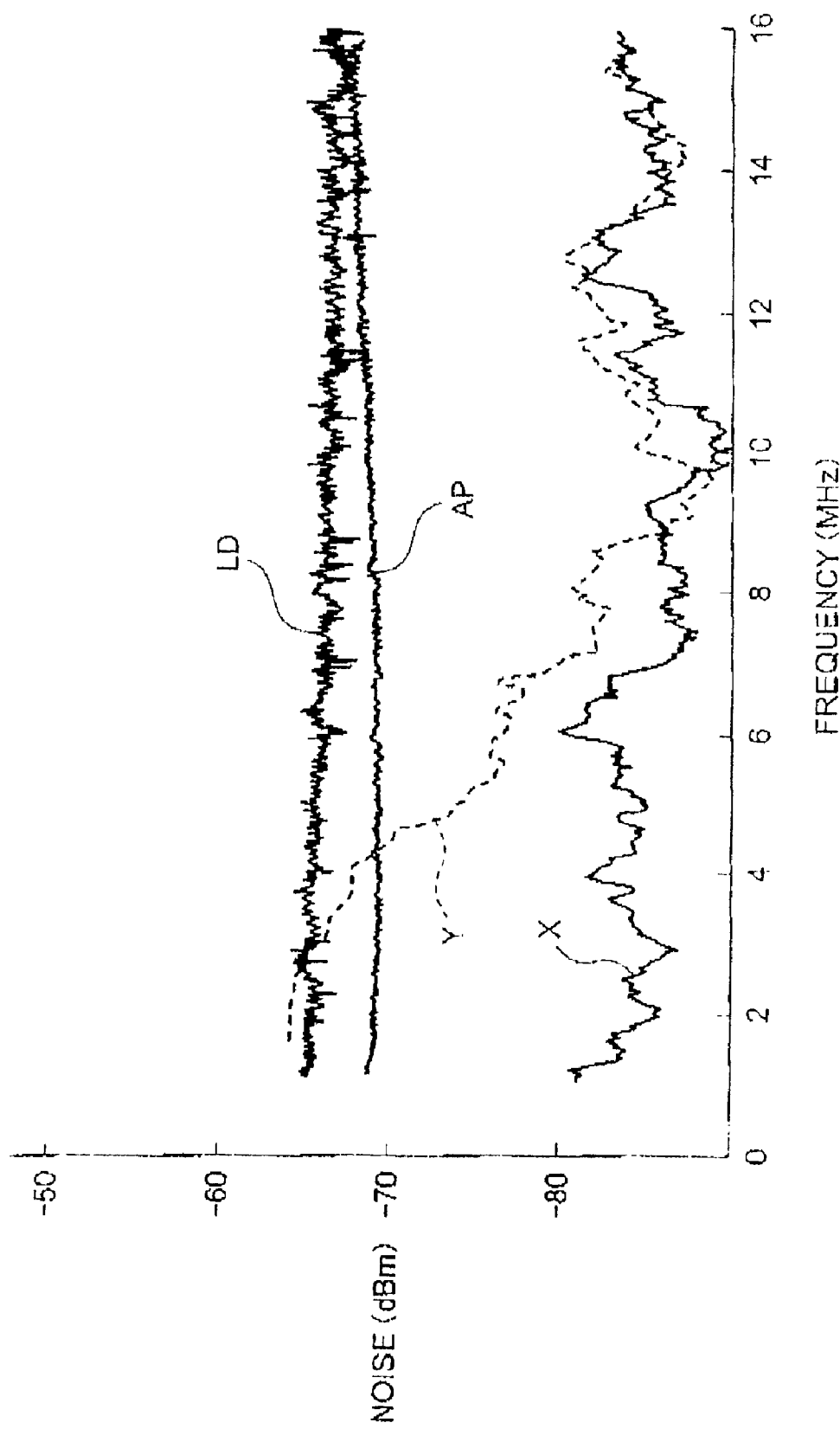
FIG. 18 is a view of results of a noise level measured in Example 1.

The results of the noise level are shown in FIG. 18 where the ordinate indicates the noise value and the abscissa indicates the frequency. In the figure, the solid line X indicates the noise level of a disk substrate produced by using a silicon substrate stamper.

In FIG. 18, the broken line Y indicates the noise level of a disk substrate produced under the same conditions as above using a nickel stamper prepared in accordance with the conventional method.

In FIG. 18, "LD" indicates the fluctuation of power during the measurement of a laser diode used for measurement, while "AP" indicates the fluctuation during measurement of an amplifier used for measurement.

From FIG. 18, it was confirmed that there was a large difference in noise level between a disk substrate produced by using a nickel stamper and a disk substrate produced by using a silicon substrate stamper and that the 50-section moving average of the noise value was −75.7 dBm in the disk substrate produced by using a nickel stamper, but that was −85.3 dBm in a disk substrate produced by using a silicon substrate stamper, so the noise in the low frequency region was reduced by about 10 dBm.

Here, the "50-section moving average" is the average obtained by processing taking the average of the first to 50th points of the frequency, using this as the data of the 50th point, then taking the average of the second to 51st points, using this as the data of the 51st point, and on to successively shift the points to be averaged.

Further, the surface roughnesses (Ra) of the mirror surfaces of the disk substrate produced using the above nickel stamper and the disk substrate produced by using a silicon substrate stamper were measured.

The surface roughness (Ra) of the disk substrate produced by the nickel stamper was at least 0.3 nm, while the surface roughness of the dusk substrate produced by using the silicon substrate stamper was not more than 0.2 nm. Thus, the surface roughness of the disk substrate was reduced by using the stamper of the present invention.

EXAMPLE 2

A silica glass substrate having a thickness of 0.6 mm to 1.2 mm mirror polished on its surface was used to prepare a stamper of a glass substrate according to the first embodiment.

Namely, the glass substrate was formed with a resist film (TSMR-V50 made by Tokyo Ohka Kogyo Co., Ltd.) to a thickness of 45 nm by spin coating. After drying, the regions for forming the grooves were exposed by a laser and developed by an inorganic alkali developing solution (DE-4 made by Tokyo Ohka Kogyo Co., Ltd.) for 15 to 30 seconds, then the unexposed portions were removed.

Next, reactive ion etching (RIE) was performed using the above resist film as a mask to form grooves having a depth of 40 nm, then the resist film was removed to thereby obtain a glass stamper formed with a relief pattern for the second optical recording multilayer film.

Here, the reactive ion etching (RIE) was performed under conditions of an RF power of 200 W, an etching gas of $CF_4$, a pressure of 1 Pa, a gas flow rate of 50 sccm, and a glass substrate temperature of 20° C. These were the same as the RIE conditions for the silicon substrate of Example 1, but in the etching of the glass substrate, the etching speed became 40 nm/min, so the etching was performed for one minute under these conditions.

The signal surface of the obtained glass substrate was coated with a protective film material (Clean Coat S made by Fine Chemical Japan Co., Ltd.) This was dried to form a protective film. A double column structure three dimensional fine processor and diamond-containing plastic grinding wheel (Diamond Resin or, when also used for rough grinding, Vitrified Diamond S type made by FSK Co., Ltd.) were used to grind the inner and outer circumferential shapes by helical grinding. The grinding was performed by a total of four steps: rough grinding I, rough grinding II, finishing I, and finishing II. The conditions of the configurations (spindle speed, XY-axial movement, Z-axial movement, and cutting feed) were as shown in Table 2.

TABLE 2

|  | Rough grinding I | Rough grinding II | Finishing I | Finishing II |
|---|---|---|---|---|
| Spindle speed (rpm) | 10,000 | 20,000 | 25,000 | 30,000 |

TABLE 2-continued

|  | Rough grinding I | Rough grinding II | Finishing I | Finishing II |
|---|---|---|---|---|
| XY-axial movement (mm) | Cut off | 0.1 | 0.02 | 0.005 |
| Z-axial movement (mm) | 0.02 | 2.9 | 2.9 | 2.0 |
| Cutting feed (mm/min) | 200 | 20 | 10.0 | 5.0 |

The obtained glass stamper was attached by suction to the upper mold of a press machine capable of introduction of ultraviolet rays from the outside shown in FIG. 13 while positioning it using centering pins.

On the other hand, the lower mold of the above press has attached to it by suction the disk substrate obtained in Example 1 formed with the first optical recording multilayer film while positioning it using centering pins.

The above first optical recording multilayer film was coated with ultraviolet curing resin in a donut shape by a dispenser attached to an XY robot. The amount of the ultraviolet curing resin coated at this time was made an amount not being squeezed out from either the inner or outer circumferences from the space between the first optical recording multilayer film and the glass stamper when being pressed and becoming the desired thickness after curing.

The hydraulic ram shown in FIG. 13 was elevated at a speed of more than 50 mm/min to a position right before the ultraviolet curing resin on the first optical recording multilayer film contacted the glass stamper, then the elevation speed of the hydraulic ram was switched to less than 50 mm/min in order to prevent air inclusion. The speed was switched to less than 20 mm/min from a position of about 0.5 mm from the final press position. The ultraviolet curing resin was spread by pressing to the inner and outer circumferences in this way.

Next, from the point of the time when the ultraviolet curing resin started to be spread by pressing to the point when it was spread by pressing to close to 50%, an ultraviolet ray lamp was turned on to irradiate the resin with ultraviolet rays via a light guide path from the centering pins and selectively cure the inner circumference. While irradiating the entire surface with ultraviolet rays through the glass stamper, the pressure was held at a desired position in a position-controlled molding machine, while the cavity was secured by the mold assembly in a non-position-controlled molding machine to thereby cure the ultraviolet curing resin. At this time, the pressing speed is preferably not more than 20 mm/mm.

After pressing and curing, under control of a timer of the hydraulic ram, the suction of the glass stamper held at the upper mold was released and the hydraulic ram was lowered in the state with the glass stamper fixed to the disk substrate.

After finishing being lowered, another ultraviolet ray unit was used as an auxiliary means to completely cure the ultraviolet curing resin through the entire surface of the glass stamper and thereby obtain a light transmitting layer.

By further projecting out guide pins at the inner circumference of the lower mold by air and simultaneously blowing air to separate the glass stamper and the light transmitting layer comprising the cured ultraviolet curing resin at their interface, a light transmitting layer having the relief pattern for the second optical recording multilayer film transferred to it was obtained on the first optical recording multilayer film.

Next, the relief pattern for the second optical recording multilayer film was formed over it with a second optical recording multilayer film comprising a thin film of aluminum or its alloy etc. controlled in reflectance to about 30% by sputtering.

Finally, a protective film of an ultraviolet curing resin was formed or a film for use as the protective film was adhered to thereby prepare an optical disk having a two-layer structure.

EXAMPLE 3

A glass stamper formed with a relief pattern for a third optical recording multilayer film formed in the same way as in Example 2 was attached by suction to the upper mold of the press shown in FIG. 13 capable of introduction of ultraviolet rays from the outside while positioning it by centering pins.

On the other hand, the lower mold of the press has attached to it by suction a stamper formed with a relief pattern for the second optical recording multilayer film while positioning it by centering pins.

An ultraviolet curing resin was coated in the same way as in Example 2, the molds pressed, and ultraviolet rays irradiated for curing to form a light transmitting layer; the stamper being formed with the relief pattern for the second optical recording multilayer film was separated from the formed light transmitting layer; and the obtained relief pattern for the second optical recording multilayer film was formed with a second optical recording multilayer film comprising a thin film of aluminum or its alloy etc. controlled in reflectance to about 30% by sputtering.

The second optical recording multilayer film was bonded with the disk substrate obtained in Example 1 formed with the first optical recording multilayer film in the same way as above; the glass stamper formed with the relief pattern for the third optical recording multilayer film was separated from the light transmitting layer; and the obtained relief pattern for the third optical recording multilayer film was formed with a third optical recording multilayer film comprising a thin film of aluminum or its alloy etc. controlled in reflectance to about 15% by sputtering.

Finally, a protective film of an ultraviolet curing resin was formed or a film for use as the protective film was adhered to thereby prepare an optical disk having a three-layer structure.

EXAMPLE 4

A stamper was prepared from a silicon substrate having a thickness of 0.4 mm mirror polished on its surface according to Example 1. As a result, a stamper having a circularity of inner circumference of not more than 0.9 $\mu$m was obtained.

Further, when preparing a stamper from a glass substrate having a thickness of 0.6 mm mirror polished on its surface, a stamper having a circularity of inner circumference to not more than 0.9 $\mu$m could be obtained in the same way.

On the other hand, as a comparative example, a nickel stamper having a thickness of 0.3 mm was prepared in accordance with the method of the related art. In the case of a nickel stamper processed at its inner and outer circumferences by grinding, the circularity was 0.9 to 1.4 µm, in the case of a nickel stamper processed at its inner and outer circumferences by the method of co-grinding by turning, the circularity was 1.1 to 1.7 µm, and in the case of a nickel stamper processed at its inner and outer circumferences by punching by a punching press, the circularity was 3.5 to 4.5 µm. In each case, the circularity was larger than that in the stamper of the present invention.

EXAMPLE 5

A stamper was prepared from a silicon substrate having a thickness of 0.4 mm mirror polished on its surface according to Example 1.

Further, in accordance with the method of the related art, a nickel stamper was prepared and this used to prepare a disk substrate to produce an optical disk.

A tracking error signal (TE) and a focus error signal (FE) of the two disks were measured.

Figure 19A:
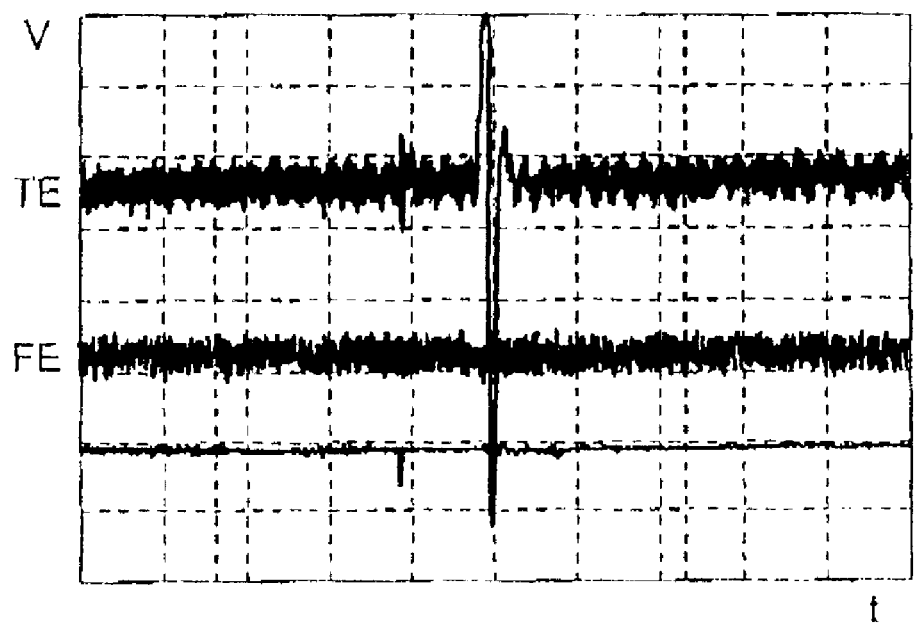
FIG. 19A and FIG. 19B are views of results of a tracking error signal and a focus error signal measured in Example 5.
Figure 19B:

FIG. 19A shows the tracking error signal (TE) and focus error signal (FE) of an optical disk when preparing a stamper from a silicon substrate, while FIG. 19B shows the tracking error signal (TE) and focus error signal (FE) of an optical disk when preparing a nickel stamper. The ordinate shows the values of the signals on a relative basis. FIG. 19A and FIG. 19B use a common scale.

As shown in FIG. 19B, in the case of a nickel stamper, scratches caused by abrasives in the polishing agent during the back polishing appear as macro relief (waviness) at the formed disk substrate due to the filling pressure at the time of injection molding. The residual discrepancy of focus error caused by the above ends up becoming large. As shown in FIG. 19A, however, since a flat stamper without scratches due to the back polishing can be obtained, the residual discrepancy of focus error of the obtained optical disk becomes extremely small.

The present invention is not limited to the above embodiments.

For example, the layer configuration of the optical recording multilayer film is not limited to the configurations explained in the embodiments. A variety of configurations can be used in accordance with the material of the recording film etc.

Further, the present invention can be applied to a magneto-optical recording medium and an optical disk medium using an organic pigment material in addition to a phase change type optical recording medium.

Further, the present invention can be applied to an optical disk of a configuration irradiated by recording or reproduction light from the disk substrate side.

Figure 2A:
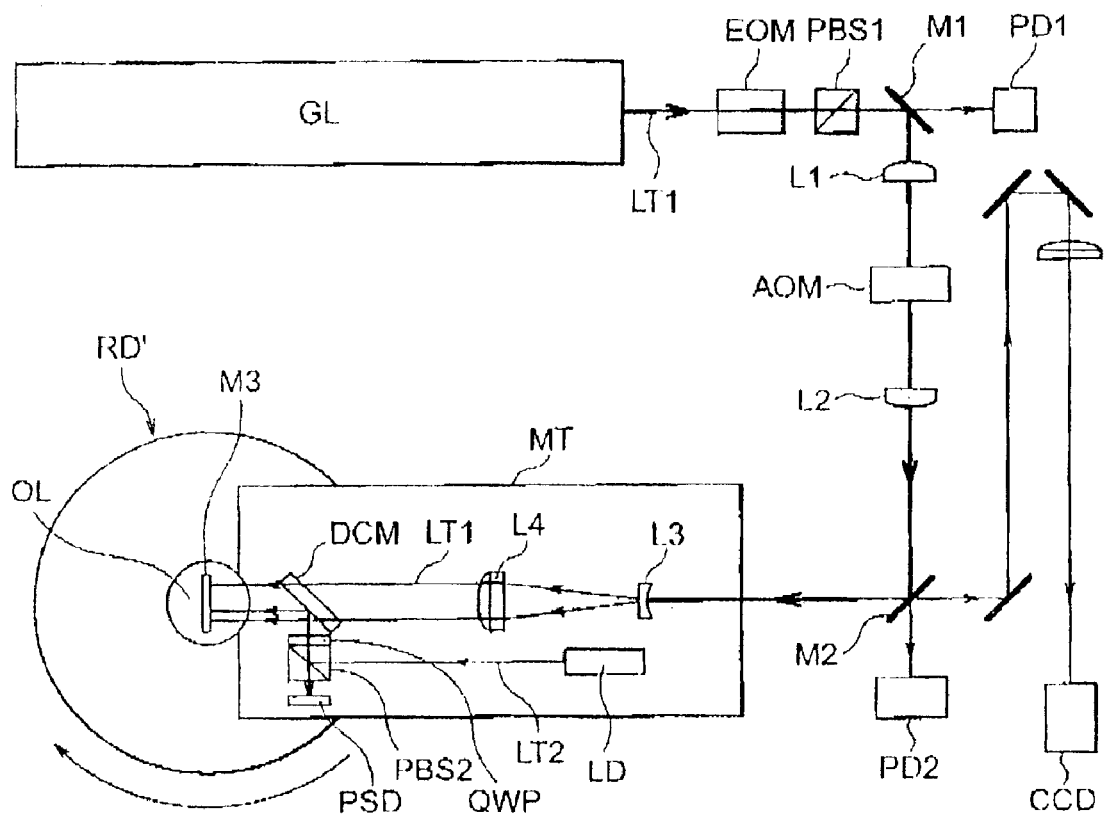
Figure 2B:
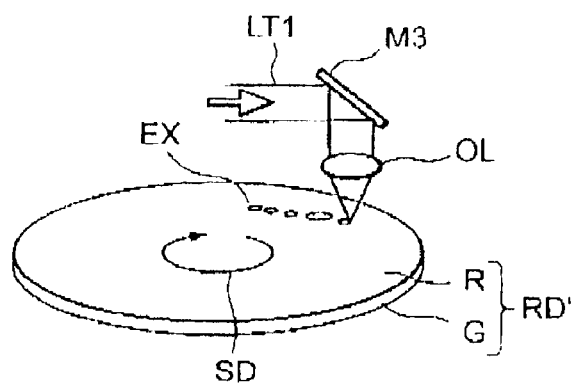
FIG. 2B is a perspective view of principal portions thereof.
Figure 3A:
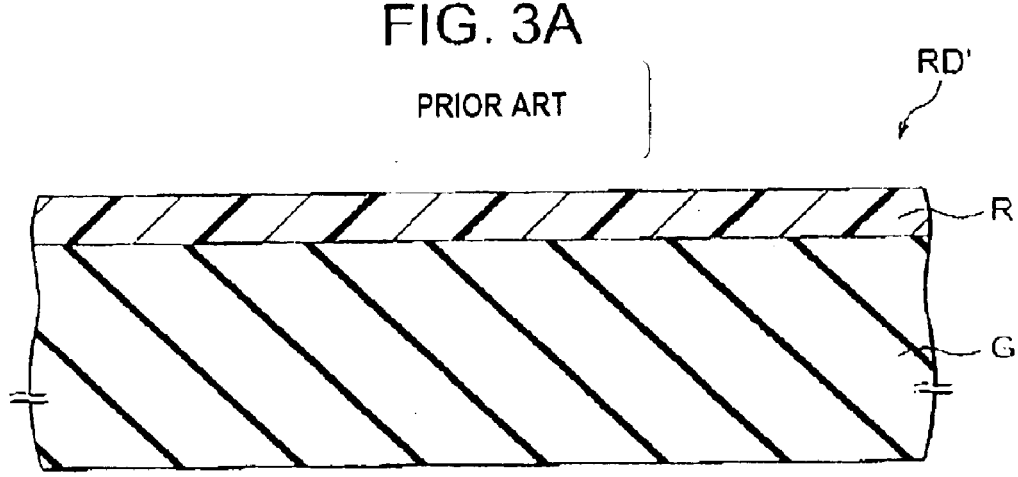
Figure 3B:
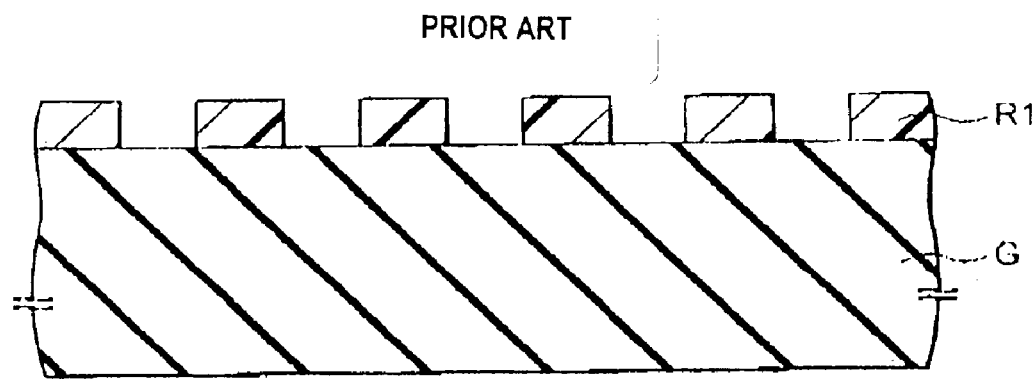
Figure 4A:
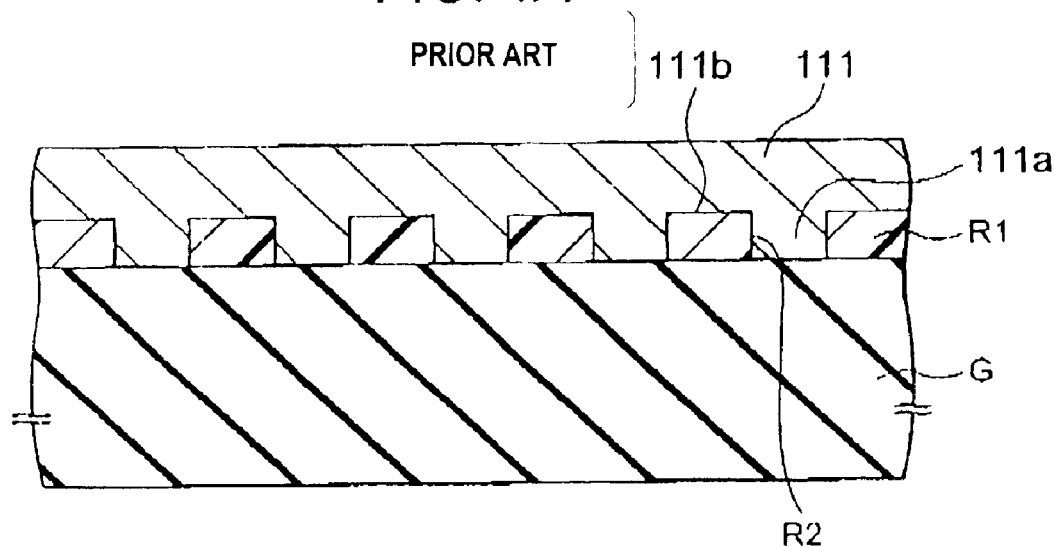
Figure 4B:
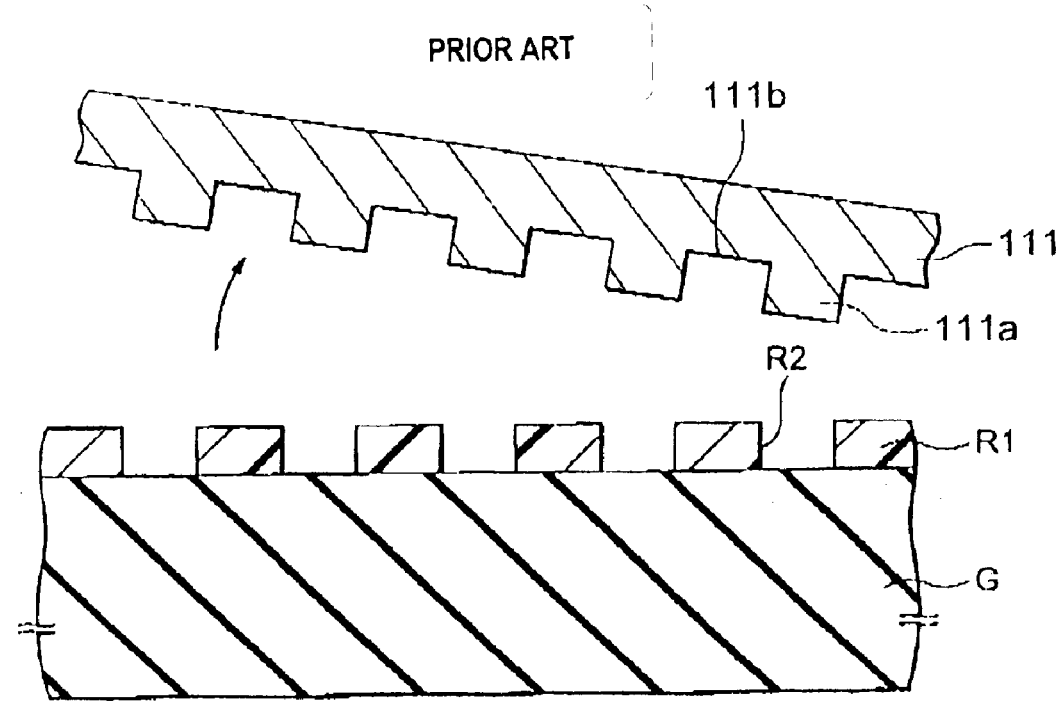
Figure 5A:
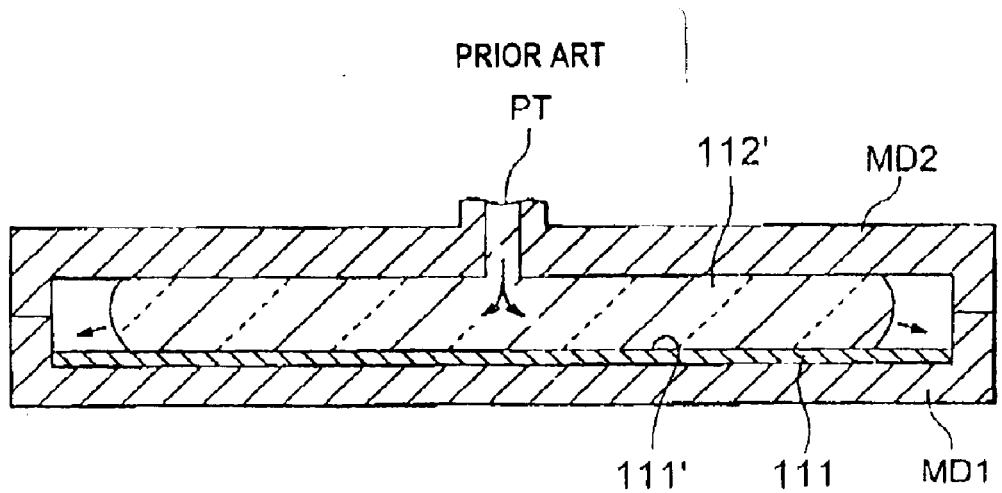
FIG. 5A is a schematic view and FIG. 5B is a cross-sectional view of an injection molding step continuing from FIG. 4B.
Figure 5B:
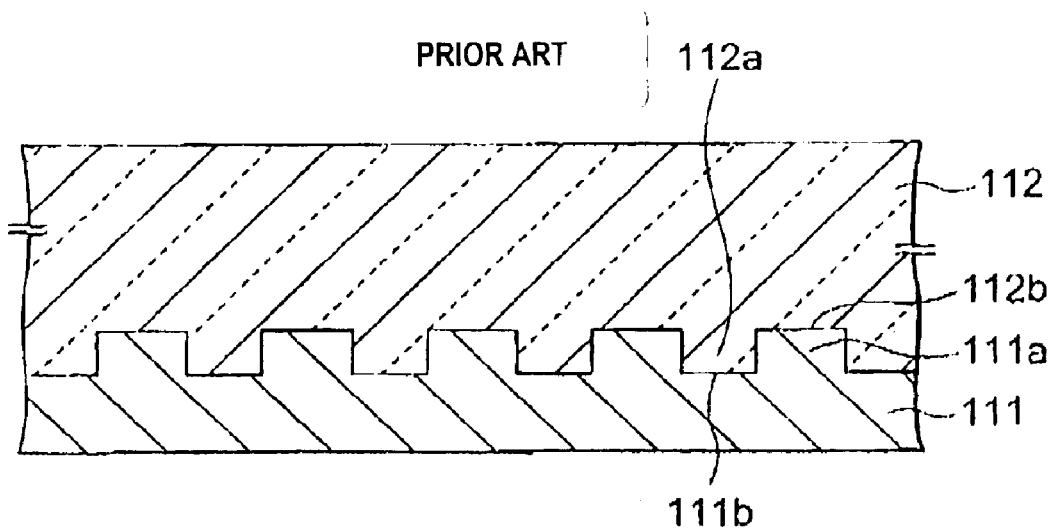
Figure 6A:
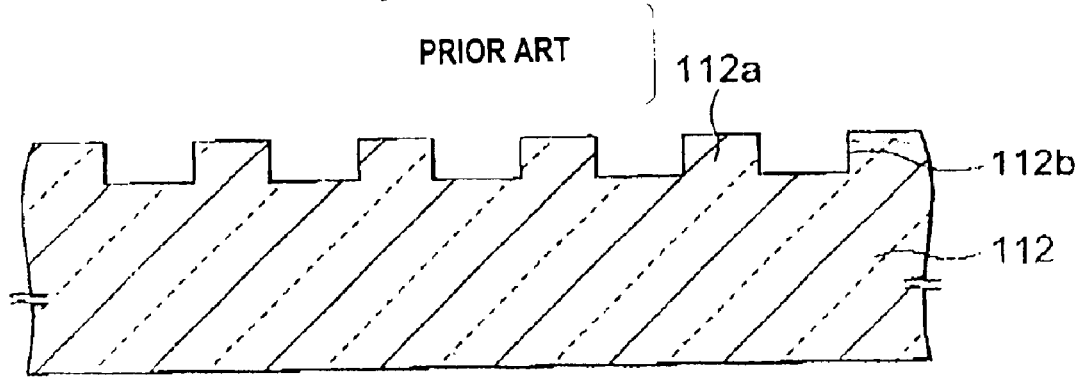
Figure 6B:
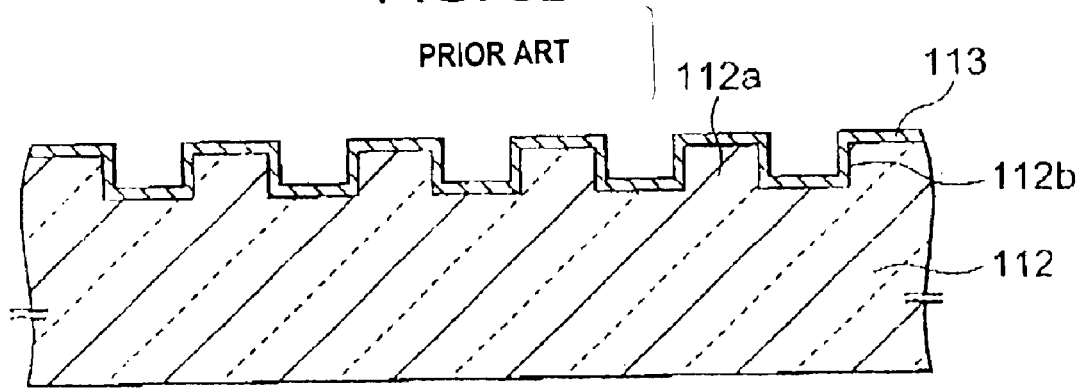
Figure 6C:
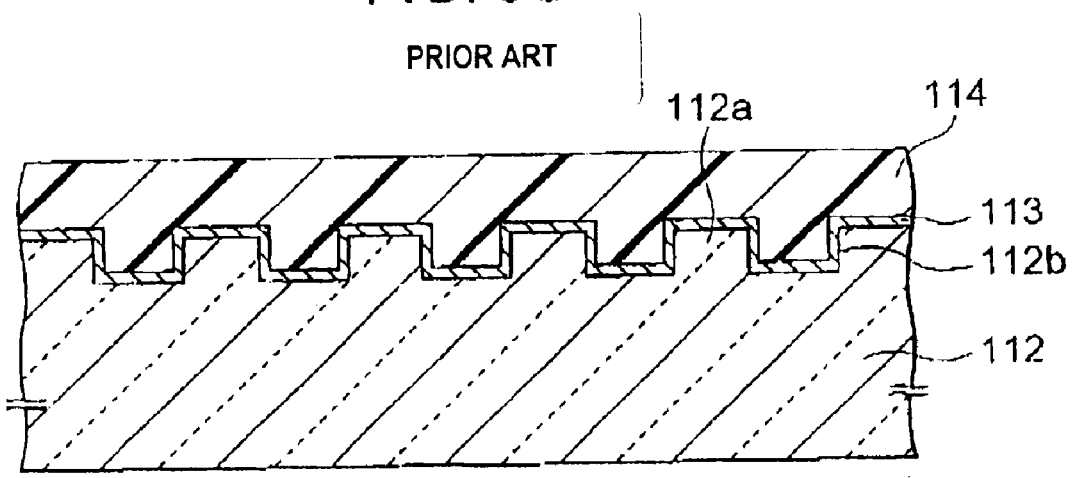

Further, the resist disk can be exposed by an electron beam exposure apparatus, ultraviolet ray laser, etc. A cutting apparatus having an equivalent configuration to that shown in FIGS. 2A and 2B can be used.

A variety of modifications can be made within the scope of the present invention in addition to the above.

Summarizing the effects of the invention, according to the stamper for producing an optical recording medium used in a process of producing an optical disk of the present invention, a stamper suppressed in surface roughness, uneven thickness, and circularity of inner circumference can be provided.

Further, according to the method of producing the stamper for producing an optical recording medium of the present invention, a stamper suppressed in surface roughness, uneven thickness, and circularity of inner circumference can be produced.

Further, according to the optical recording medium of the present invention, a optical recording medium suppressed in surface roughness, uneven thickness, and circularity of inner circumference can be provided.

Further, according to the method of producing the optical recording medium of the present invention, a optical recording medium suppressed in surface roughness, uneven thickness, and circularity of inner circumference can be produced.

Note that the embodiments explained above were described to facilitate the understanding of the present invention and not to limit the present invention. Accordingly, elements disclosed in the above embodiments include all design modifications and equivalents belonging to the technical field of the present invention.

What is claimed is:

1. A method for producing a stamper for producing an optical recording medium by transferring relief shares to a surface of a medium substrate of the optical recording medium, said method including steps of:

mirror polishing one main surface of a base member;

forming a resist film on the mirror polished main surface of the base member;

processing the resist film in a pattern corresponding to the relief shapes; processing the mirror polished main surface of the base member to the relief shapes by using the resist film as a mask; and grinding an inner circumference and an outer circumference of the base member using a grinding wheel rotating at a speed of at least 10,000 rpm.

2. A method for producing a stamper for producing an optical recording medium by transferring relief shapes to a surface of a medium substrate of the optical recording medium, said method including steps of:

mirror polishing one main surface of a base member;

forming a resist film on the mirror polished main surface of the base member;

processing the resist film in a pattern corresponding to the relief shapes; processing the mirror polished main surface of the base member to the relief shapes by using the resist film as a mask;

grinding an inner circumference and an outer circumference of the base member using a grinding wheel rotating at a speed of at least 10,000; and grinding the circumferences using a plastic grinding wheel or a vitrified grinding wheel mixed with diamond powder in at least a finishing process of the step of grinding the inner circumference and outer circumference of the base member.

3. A method for producing a stamper for producing an optical recording medium by transferring relief shapes to a surface of a medium substrate of the optical recording medium, said including steps of:

mirror polishing one main surface of a base member;

forming a resist film on the minor polished main surface of the base member;

processing the resist film in a pattern corresponding to the relief shapes;

processing the mirror polished main surface of the base member to the relief shapes by using the resist film as a mask;

grinding an inner circumference and an outer circumference of the base member using a grinding wheel rotating at a speed of at least 10,000 rpm; and placing a dummy plate made by the same material as the base member or a material having an equivalent hardness against at least on the minor polished main surface and co-grinding the base member and the dummy plate in the step of grinding the inner circumference and outer circumference of the base member.

* * * * *